United States Patent
Lazier

(10) Patent No.: US 10,558,581 B1
(45) Date of Patent: Feb. 11, 2020

(54) SYSTEMS AND TECHNIQUES FOR DATA RECOVERY IN A KEYMAPLESS DATA STORAGE SYSTEM

(71) Applicant: Amazon Technologies, Inc., Reno, NV (US)

(72) Inventor: Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 13/770,892

(22) Filed: Feb. 19, 2013

(51) Int. Cl.
  *G06F 11/10* (2006.01)
  *G06F 12/1018* (2016.01)
  *G06F 3/06* (2006.01)

(52) U.S. Cl.
  CPC ........ *G06F 12/1018* (2013.01); *G06F 3/0689* (2013.01); *G06F 11/1076* (2013.01); *G06F 11/1096* (2013.01)

(58) Field of Classification Search
  CPC ............... G06F 12/1018; G06F 3/0689; G06F 11/1076; G06F 11/1096
  See application file for complete search history.

(56) References Cited

U.S. PATENT DOCUMENTS

| | | |
|---|---|---|
| 5,239,640 A | 8/1993 | Froemke et al. |
| 5,506,809 A | 4/1996 | Csoppenszky et al. |
| 5,586,291 A | 12/1996 | Lasker et al. |
| 5,701,407 A * | 12/1997 | Matsumoto .......... G06F 3/0601 714/6.32 |
| 5,737,745 A * | 4/1998 | Matsumoto .......... G06F 3/0601 711/114 |
| 5,751,997 A | 5/1998 | Kullick et al. |
| 5,900,007 A | 5/1999 | Nunnelley et al. |
| 6,023,710 A | 2/2000 | Steiner et al. |
| 6,138,126 A | 10/2000 | Hitz |
| 6,208,999 B1 * | 3/2001 | Spilo .................. G06F 11/1435 |
| 6,374,264 B1 | 4/2002 | Bohannon et al. |

(Continued)

FOREIGN PATENT DOCUMENTS

| | | |
|---|---|---|
| CN | 1487451 | 4/2004 |
| CN | 1534949 A | 10/2004 |

(Continued)

OTHER PUBLICATIONS

Advanced Computer & Network Corporation, "RAID Level 5: Independent Data Disks With Distributed Parity Blocks", May 12, 2011, pp. 1-2, https://web.archive.org/web/20110512213916/http://www.acnc.com/raidedu/5.*

(Continued)

*Primary Examiner* — Christopher D Birkhimer
(74) *Attorney, Agent, or Firm* — Davis Wright Tremaine LLP

(57) ABSTRACT

Components of a data object are distributed throughout a data storage system. Manifests are used to store the locations of the components of data objects in a data storage system to allow for subsequent reconstruction of the data objects. The manifests may be stored in another data storage system when cost projections indicate it being economical to do so. If a manifest for a data object becomes lost or otherwise inaccessible, clues are used to regenerate the manifest, thereby providing a continued ability to access the components of the data object to reconstruct the data object.

26 Claims, 10 Drawing Sheets

(56) References Cited

U.S. PATENT DOCUMENTS

| | | | |
|---|---|---|---|
| 6,543,029 B1 | 4/2003 | Sandorfi | |
| 6,578,127 B1 | 6/2003 | Sinclair | |
| 6,604,224 B1 | 8/2003 | Armstrong et al. | |
| 6,606,629 B1 | 8/2003 | DeKoning et al. | |
| 6,747,825 B1 * | 6/2004 | Ng | G11B 5/09 360/31 |
| 6,768,863 B2 | 7/2004 | Ando et al. | |
| 6,775,831 B1 * | 8/2004 | Carrasco | H04L 29/06 707/999.003 |
| 6,950,967 B1 | 9/2005 | Brunnett et al. | |
| 6,959,326 B1 | 10/2005 | Day et al. | |
| 7,076,604 B1 | 7/2006 | Thelin | |
| 7,120,737 B1 | 10/2006 | Thelin | |
| 7,155,713 B1 * | 12/2006 | Burkhardt | G06F 8/65 717/175 |
| 7,269,733 B1 | 9/2007 | O'Toole, Jr. | |
| 7,310,801 B2 * | 12/2007 | Burkhardt | G06F 8/65 717/169 |
| 7,340,490 B2 * | 3/2008 | Teloh | G06F 11/2058 |
| 7,409,495 B1 | 8/2008 | Kekre et al. | |
| 7,487,316 B1 | 2/2009 | Hall et al. | |
| 7,487,385 B2 * | 2/2009 | Rodrigues et al. | 714/6.1 |
| 7,577,689 B1 | 8/2009 | Masinter et al. | |
| 7,644,061 B1 | 1/2010 | Fallis et al. | |
| 7,685,309 B2 | 3/2010 | Caronni et al. | |
| 7,730,071 B2 | 6/2010 | Iwasaki et al. | |
| 7,774,466 B2 | 8/2010 | Coates et al. | |
| 7,783,600 B1 | 8/2010 | Spertus et al. | |
| 7,814,078 B1 | 10/2010 | Forman et al. | |
| 7,827,201 B1 | 11/2010 | Gordon et al. | |
| 7,840,878 B1 | 11/2010 | Tang et al. | |
| 7,860,825 B2 * | 12/2010 | Chatterjee | G06F 17/30194 705/51 |
| 7,929,551 B2 * | 4/2011 | Dietrich | G06F 17/30017 370/395.5 |
| 7,937,369 B1 | 5/2011 | Dings et al. | |
| 8,006,125 B1 * | 8/2011 | Meng | G06F 11/1417 714/6.2 |
| 8,015,158 B1 | 9/2011 | Mankovsky et al. | |
| 8,019,925 B1 | 9/2011 | Vogan et al. | |
| 8,041,677 B2 * | 10/2011 | Sumner | G06F 11/1453 707/640 |
| 8,051,052 B2 * | 11/2011 | Jogand-Coulomb | G06F 21/10 707/694 |
| 8,060,473 B1 | 11/2011 | Dhumale et al. | |
| 8,108,686 B2 * | 1/2012 | Dik | G06F 21/645 713/176 |
| 8,130,554 B1 | 3/2012 | Linnell | |
| 8,140,843 B2 * | 3/2012 | Holtzman | H04L 9/3228 707/687 |
| 8,156,381 B2 | 4/2012 | Tamura et al. | |
| 8,161,292 B2 * | 4/2012 | Carbone | G06F 21/568 713/188 |
| 8,204,969 B2 * | 6/2012 | Carcerano | G06F 8/65 709/202 |
| 8,245,031 B2 * | 8/2012 | Holtzman | H04L 9/3228 713/158 |
| 8,266,691 B2 * | 9/2012 | Zvi | G06F 21/56 713/165 |
| 8,266,711 B2 * | 9/2012 | Holtzman | G06F 21/78 711/163 |
| 8,291,170 B1 | 10/2012 | Zhang et al. | |
| 8,296,410 B1 * | 10/2012 | Myhill | G06F 11/1464 709/223 |
| 8,336,043 B2 * | 12/2012 | Lavery | G06F 8/60 717/173 |
| 8,352,430 B1 * | 1/2013 | Myhill | G06F 11/1464 707/640 |
| 8,352,439 B1 | 1/2013 | Lee et al. | |
| 8,370,315 B1 | 2/2013 | Efstathopoulos et al. | |
| 8,464,133 B2 | 6/2013 | Grube et al. | |
| 8,473,816 B2 | 6/2013 | Zvibel | |
| 8,554,918 B1 | 10/2013 | Douglis | |
| 8,595,596 B2 | 11/2013 | Grube et al. | |
| 8,620,870 B2 | 12/2013 | Dwarampudi et al. | |
| 8,671,076 B2 | 3/2014 | Price et al. | |
| 8,699,159 B1 | 4/2014 | Malina | |
| 8,806,502 B2 | 8/2014 | Gargash et al. | |
| 8,838,911 B1 | 9/2014 | Hubin et al. | |
| 8,898,114 B1 | 11/2014 | Feathergill et al. | |
| 8,959,067 B1 | 2/2015 | Patiejunas et al. | |
| 8,972,677 B1 | 3/2015 | Jones | |
| 8,990,215 B1 | 3/2015 | Reztaff, II et al. | |
| 9,047,306 B1 | 6/2015 | Frolund et al. | |
| 9,053,212 B2 | 6/2015 | Beckey et al. | |
| 9,372,854 B2 | 6/2016 | Gold et al. | |
| 2002/0055942 A1 | 5/2002 | Reynolds | |
| 2002/0091903 A1 | 7/2002 | Mizuno | |
| 2002/0103815 A1 | 8/2002 | Duvillier et al. | |
| 2002/0122203 A1 | 9/2002 | Matsuda | |
| 2002/0161972 A1 | 10/2002 | Talagala et al. | |
| 2002/0186844 A1 | 12/2002 | Levy et al. | |
| 2003/0033308 A1 | 2/2003 | Patel et al. | |
| 2003/0145213 A1 * | 7/2003 | Carbone | G06F 21/563 713/188 |
| 2003/0149717 A1 | 8/2003 | Heinzman | |
| 2004/0003272 A1 | 1/2004 | Bantz et al. | |
| 2004/0098565 A1 | 5/2004 | Rohlman et al. | |
| 2004/0243737 A1 | 12/2004 | Beardsley et al. | |
| 2005/0050342 A1 | 3/2005 | Boivie et al. | |
| 2005/0114338 A1 | 5/2005 | Borthakur et al. | |
| 2005/0160427 A1 | 7/2005 | Ustaris | |
| 2005/0187897 A1 | 8/2005 | Pawar et al. | |
| 2005/0203976 A1 | 9/2005 | Hyun et al. | |
| 2005/0262378 A1 | 11/2005 | Sleeman et al. | |
| 2005/0267935 A1 | 12/2005 | Gandhi et al. | |
| 2006/0005074 A1 * | 1/2006 | Yanai | G06F 3/0601 714/6.32 |
| 2006/0015529 A1 * | 1/2006 | Yagawa | G06F 17/30067 |
| 2006/0020594 A1 | 1/2006 | Garg et al. | |
| 2006/0095741 A1 | 5/2006 | Asher et al. | |
| 2006/0107266 A1 | 5/2006 | Martin et al. | |
| 2006/0190510 A1 | 8/2006 | Gabryjelski et al. | |
| 2006/0242064 A1 * | 10/2006 | Jogand-Coulomb | G06F 21/10 705/50 |
| 2006/0242065 A1 * | 10/2006 | Jogand-Coulomb | G06F 21/10 705/50 |
| 2006/0242066 A1 * | 10/2006 | Jogand-Coulomb | G06F 21/10 705/50 |
| 2006/0242067 A1 * | 10/2006 | Jogand-Coulomb | G06F 21/6218 705/50 |
| 2006/0242068 A1 * | 10/2006 | Jogand-Coulomb | G06F 21/6218 705/50 |
| 2006/0242150 A1 * | 10/2006 | Jogand-Coulomb | G06F 21/10 |
| 2006/0242151 A1 * | 10/2006 | Jogand-Coulomb | G06F 21/10 |
| 2006/0272023 A1 | 11/2006 | Schmeidler et al. | |
| 2007/0011472 A1 | 1/2007 | Cheng | |
| 2007/0043667 A1 * | 2/2007 | Qawami | G06F 21/10 705/50 |
| 2007/0050479 A1 | 3/2007 | Yoneda | |
| 2007/0056042 A1 * | 3/2007 | Qawami | G06F 21/10 726/26 |
| 2007/0079087 A1 | 4/2007 | Wang et al. | |
| 2007/0101095 A1 | 5/2007 | Gorobets | |
| 2007/0156842 A1 | 7/2007 | Vermeulen et al. | |
| 2007/0168292 A1 | 7/2007 | Jogand-Coulomb | G06F 21/6218 705/52 |
| 2007/0174362 A1 | 7/2007 | Pham et al. | |
| 2007/0198789 A1 | 8/2007 | Clark et al. | |
| 2007/0250674 A1 | 10/2007 | Fineberg et al. | |
| 2007/0266037 A1 * | 11/2007 | Terry et al. | 707/100 |
| 2007/0282969 A1 * | 12/2007 | Dietrich | G06F 17/30017 709/217 |
| 2007/0283046 A1 * | 12/2007 | Dietrich | G06F 17/30017 709/245 |
| 2008/0010449 A1 * | 1/2008 | Holtzman | G06F 21/445 713/157 |

(56) References Cited

U.S. PATENT DOCUMENTS

| | | | |
|---|---|---|---|
| 2008/0010450 A1* | 1/2008 | Holtzman | H04L 9/3228 713/157 |
| 2008/0010451 A1* | 1/2008 | Holtzman | H04L 9/3228 713/158 |
| 2008/0010452 A1* | 1/2008 | Holtzman | H04L 9/3228 713/158 |
| 2008/0010455 A1* | 1/2008 | Holtzman | H04L 9/3228 713/168 |
| 2008/0010458 A1* | 1/2008 | Holtzman | H04L 63/0823 713/175 |
| 2008/0010685 A1* | 1/2008 | Holtzman | G06F 12/1483 726/27 |
| 2008/0022395 A1* | 1/2008 | Holtzman | G06F 12/1483 726/19 |
| 2008/0022413 A1* | 1/2008 | Holtzman | G06F 21/6218 726/27 |
| 2008/0034440 A1* | 2/2008 | Holtzman | G06F 21/10 726/27 |
| 2008/0059483 A1 | 3/2008 | Williams et al. | |
| 2008/0068899 A1 | 3/2008 | Ogihara et al. | |
| 2008/0109478 A1 | 5/2008 | Wada et al. | |
| 2008/0120164 A1 | 5/2008 | Hassler | |
| 2008/0168108 A1* | 7/2008 | Molaro et al. | 707/202 |
| 2008/0177697 A1 | 7/2008 | Barsness et al. | |
| 2008/0201707 A1* | 8/2008 | Lavery | G06F 8/60 717/178 |
| 2008/0212225 A1* | 9/2008 | Ito et al. | 360/71 |
| 2008/0235485 A1 | 9/2008 | Haertel et al. | |
| 2008/0256631 A1* | 10/2008 | Zvi | G06F 21/56 726/22 |
| 2008/0285366 A1 | 11/2008 | Fujiwara | |
| 2008/0294764 A1 | 11/2008 | Wakako | |
| 2009/0013123 A1* | 1/2009 | Hsieh | G06F 11/1435 711/103 |
| 2009/0070537 A1* | 3/2009 | Cho | 711/162 |
| 2009/0083476 A1 | 3/2009 | Pua et al. | |
| 2009/0113167 A1 | 4/2009 | Camble et al. | |
| 2009/0132676 A1* | 5/2009 | Tu | H04L 67/2823 709/217 |
| 2009/0150641 A1* | 6/2009 | Flynn et al. | 711/202 |
| 2009/0157700 A1 | 6/2009 | Van Vugt | |
| 2009/0164506 A1 | 6/2009 | Barley et al. | |
| 2009/0187768 A1* | 7/2009 | Carbone | G06F 21/563 713/188 |
| 2009/0193223 A1 | 7/2009 | Saliba et al. | |
| 2009/0198736 A1 | 8/2009 | Shen et al. | |
| 2009/0198889 A1* | 8/2009 | Ito et al. | 711/115 |
| 2009/0213487 A1 | 8/2009 | Luan et al. | |
| 2009/0234883 A1 | 9/2009 | Hurst et al. | |
| 2009/0240750 A1* | 9/2009 | Seo | 707/205 |
| 2009/0254572 A1 | 10/2009 | Redlich et al. | |
| 2009/0265568 A1 | 10/2009 | Jackson | |
| 2009/0300403 A1 | 12/2009 | Little | |
| 2010/0017446 A1* | 1/2010 | Choi et al. | 707/205 |
| 2010/0037056 A1 | 2/2010 | Follis et al. | |
| 2010/0037216 A1 | 2/2010 | Carcerano | G06F 8/65 717/173 |
| 2010/0070775 A1* | 3/2010 | Dik | G06F 21/645 713/187 |
| 2010/0077214 A1* | 3/2010 | Jogand-Coulomb | G06F 21/6218 713/170 |
| 2010/0088496 A1* | 4/2010 | Zolnowsky | G06F 21/51 712/245 |
| 2010/0094819 A1 | 4/2010 | Bornhoevd et al. | |
| 2010/0131411 A1* | 5/2010 | Jogand-Coulomb | G06F 21/10 705/54 |
| 2010/0131774 A1* | 5/2010 | Jogand-Coulomb | G06F 21/10 713/193 |
| 2010/0131775 A1* | 5/2010 | Jogand-Coulomb | G06F 21/10 713/193 |
| 2010/0138652 A1* | 6/2010 | Sela | G06F 21/445 713/158 |
| 2010/0138673 A1* | 6/2010 | Jogand-Coulomb | G06F 21/10 713/193 |
| 2010/0169222 A1* | 7/2010 | Qawami | G06F 21/10 705/59 |
| 2010/0169544 A1 | 7/2010 | Eom et al. | |
| 2010/0217927 A1 | 8/2010 | Song et al. | |
| 2010/0223259 A1 | 9/2010 | Mizrahi | |
| 2010/0228711 A1 | 9/2010 | Li et al. | |
| 2010/0235409 A1 | 9/2010 | Roy et al. | |
| 2010/0242096 A1 | 9/2010 | Varadharajan et al. | |
| 2011/0026942 A1 | 2/2011 | Naito | |
| 2011/0035757 A1 | 2/2011 | Comer | |
| 2011/0058277 A1 | 3/2011 | de la Fuente et al. | |
| 2011/0060775 A1* | 3/2011 | Fitzgerald | G06F 11/1435 707/824 |
| 2011/0071988 A1 | 3/2011 | Resch et al. | |
| 2011/0078407 A1 | 3/2011 | Lewis | |
| 2011/0099324 A1* | 4/2011 | Yeh | 711/103 |
| 2011/0161679 A1 | 6/2011 | Grube et al. | |
| 2011/0225417 A1 | 9/2011 | Maharajh et al. | |
| 2011/0231597 A1* | 9/2011 | Lai et al. | 711/103 |
| 2011/0246716 A1* | 10/2011 | Frame et al. | 711/114 |
| 2011/0247074 A1 | 10/2011 | Manring et al. | |
| 2011/0258630 A1 | 10/2011 | Fee et al. | |
| 2011/0264717 A1* | 10/2011 | Grube et al. | 707/827 |
| 2011/0265143 A1 | 10/2011 | Grube et al. | |
| 2011/0276656 A1 | 11/2011 | Knapp et al. | |
| 2011/0282839 A1 | 11/2011 | Paksoy et al. | |
| 2011/0289383 A1 | 11/2011 | Dhuse et al. | |
| 2011/0307657 A1* | 12/2011 | Timashev | G06F 11/1451 711/112 |
| 2012/0030411 A1* | 2/2012 | Wang | G06F 11/1435 711/103 |
| 2012/0079562 A1 | 3/2012 | Anttila et al. | |
| 2012/0137062 A1 | 5/2012 | Arges et al. | |
| 2012/0143826 A1* | 6/2012 | Cormode et al. | 707/687 |
| 2012/0150528 A1 | 6/2012 | Upadhyaya et al. | |
| 2012/0166576 A1 | 6/2012 | Orsini et al. | |
| 2012/0173392 A1 | 7/2012 | Kirby et al. | |
| 2012/0210092 A1 | 8/2012 | Feldman | |
| 2012/0233228 A1* | 9/2012 | Barton | H04L 67/06 707/827 |
| 2012/0233432 A1 | 9/2012 | Feldman et al. | |
| 2012/0284719 A1 | 11/2012 | Phan et al. | |
| 2012/0306912 A1 | 12/2012 | Blanco et al. | |
| 2012/0311260 A1 | 12/2012 | Yamagiwa et al. | |
| 2013/0024581 A1* | 1/2013 | Myhill | G06F 11/1464 709/230 |
| 2013/0046974 A1 | 2/2013 | Kamara et al. | |
| 2013/0145371 A1 | 6/2013 | Brunswig et al. | |
| 2013/0254166 A1 | 9/2013 | Kottomtharayil | |
| 2013/0290263 A1 | 10/2013 | Beaverson et al. | |
| 2014/0052706 A1 | 2/2014 | Misra et al. | |
| 2014/0068208 A1 | 3/2014 | Feldman | |
| 2014/0149794 A1 | 5/2014 | Shetty et al. | |
| 2014/0161123 A1 | 6/2014 | Starks et al. | |
| 2015/0082458 A1 | 3/2015 | Cooper et al. | |

FOREIGN PATENT DOCUMENTS

| | | |
|---|---|---|
| CN | 1619479 A | 5/2005 |
| CN | 1799051 A | 7/2006 |
| CN | 101043372 A | 9/2007 |
| CN | 101110083 A | 1/2008 |
| CN | 101477543 A | 7/2009 |
| CN | 101496005 | 7/2009 |
| CN | 102292699 A | 12/2011 |
| EP | 0606131 B1 | 1/2003 |
| JP | H05113963 | 5/1993 |
| JP | H06149739 | 5/1994 |
| JP | H10261075 A | 9/1998 |
| JP | H1124997 A | 1/1999 |
| JP | H11259321 A | 9/1999 |
| JP | 2000023075 A * | 1/2000 |
| JP | 2002278844 | 9/2002 |
| JP | 2005122311 | 5/2005 |
| JP | 2006285969 A | 10/2006 |
| JP | 2006526837 | 11/2006 |

(56) References Cited

FOREIGN PATENT DOCUMENTS

| JP | 2007515002 A | 6/2007 |
|---|---|---|
| JP | 2007257566 A | 10/2007 |
| JP | 2007299308 | 11/2007 |
| JP | 2008299396 A | 12/2008 |
| JP | 2010251877 A | 11/2010 |
| JP | 2011043968 | 3/2011 |
| JP | 2011518381 A | 6/2011 |
| JP | 2011170667 A | 9/2011 |
| JP | 2011197977 A | 10/2011 |
| KR | 20020088574 A * | 11/2002 |
| KR | 20070058281 | 2/2016 |
| WO | WO0227489 | 4/2002 |
| WO | 2007016787 A2 | 2/2007 |
| WO | 2010151813 A1 | 12/2010 |
| WO | 2012088587 A1 | 7/2012 |

OTHER PUBLICATIONS

Advanced Computer & Network Corporation, "RAID level 6: Independent Data Disks With Two Independent Parity Schemes", May 7, 2011, pp. 1-2, https://web.archive.org/web/20110507215950/http://www.acnc.com/raidedu/6.*
Paul Massiglia, "The RAID Book: The Storage System Technology Handbook", 6$^{th}$ Edition, 1997, pp. 26-27, 84-91, 136-143, and 270-271.*
Charles M. Kozierok, "File Allocation Tables", Apr. 17, 2001, The PC Guide, pp. 1-2, http://www.pcguide.com/ref/hdd/file/fatFATs-c.html.*
Amer et al., "Design Issues for a Singled Write Disk System", 26$^{th}$ IEEE Symposium on Massive Storage Systems and Technologies: Research Track (MSST 2010); May 2010; 12 pages.
Gibson et al., Directions for Shingled-Write and Two-Dimensional Magnetic Recording System Architectures: Synergies with Solid-State Disks; Parallel Data Lab Technical Report CMU-PDL-09-104; Carnegie Mellon University, Parallel Data Laboratory, Research Centers and Institutes; May 1, 2009; 3 pages.
Micheloni et al., "Inside NAND Flash Memories"; Springer; 1$^{st}$ ed.; ISBN 978-90-481-9430-8; Aug. 2010; pp. 40-42.
Rosenblum et al., "The Design and Implementation of a Log-Structured File System"; ACM Transactions on Computer Systems; vol. 10, No. 1; University of California, Berkley; Feb. 1992; pp. 26-52.
Wikipedia.com, "Checksum"; retrieved from en.wikipedia.org/wiki/Checksum; Mar. 2011; 9 pages.
Wikipedia.com, "Error Correction"; retrieved from en.wikipedia.org/wiki/Error-correcting_code; Sep. 2010; 5 pages.
Yu et al., "Exploiting sequential access when declustering data over disks and MEMS-based storage"; Distributed and Parallel Databases; vol. 19, Issue 2-3; May 2006; pp. 147-168.
International Patent Application No. PCT/US2013/053853, Search Report and Written Opinion, dated Feb. 14, 2014.
International Patent Application No. PCT/US2013/053852, Search Report and Written Opinion, dated Mar. 6, 2014.
International Patent Application No. PCT/US2013/053828, Search Report and Written Opinion, dated Feb. 14, 2014.
Anonymous, "Hash Tree," *Wikipedia: The Free Encyclopedia* [online] 2012 [retrieved on Jul. 12, 2012] Retrieved from the Internet <URL: http://en.wikipedia.org/wiki/Hash_tree>.
Amazon Web Services, "Amazon Elastic MapReduce Developer Guide," API Version Nov. 30, 2009, dated Jun. 12, 2012, retrieved on Jun. 22, 2015, from https://web.archive.org/web/20120612043953/http://s3.amazonaws.com/awsdocs/ElasticMapReduce/latest/emr-dg.pdf, 318 pages.
Amazon Web Services, Amazon Glacier Developer Guide, API Version Jun. 1, 2012, dated Aug. 20, 2012, retrieved Jun. 22, 2015, from https://web.archive.org/web/20120908043705/http://awsdocs.s3.amazonaws.com/glacier/latest/glacier-dg.pdf, 209 pages.
Amazon Web Services, "AWS Import/Export Developer Guide," API Version Jun. 3, 2010, dated Jun. 12, 2012, retrieved Jun. 22, 2015, from https://web.archive.org/web/20120612051330/http://s3.amazonaws.com/awsdocs/ImportExpert/latest/AWSImportExport-dg.pdf, 104 pages.
Chen et al., "RAID: High-Performance, Reliable Secondary Storage," ACM Computing Surveys 1994, 26:145-185, retrieved on Jan. 11, 2016, from internet https://web.archive.org/web/20040721062927/http://meseec.ce.rit.edu/eecc722-fall2002/papers/io/3/chen94raid.pdf, 69 pages.
Cisco, "Cisco Standalone HDD Firmware Update Version 3.0—IBM Servers," Nov. 16, 2010, 5 pages.
Duan, "Research and Application of Distributed Parallel Search Hadoop Algorithm," 2012 International Conference on Systems and Informatics (ICSAI 2012), IEEE, May 19, 2012, pp. 2462-2465.
IEEE, "The Authoritative Dictionary of IEEE Standards Terms," Seventh Edition; 2000, p. 836.
Jacobs et al., "Memory Systems, Cache, DRAM, Disk," Copyright 2007, Morgan Kaufman, 9 pages.
Merriam-Webster, "Predetermine," Current Edition of Dictionary, www.merriam-webster.com/dictionary, retrieved on Dec. 15, 2014.
Roos, "How to Leverage an API for Conferencing," Dave Roos, published Jan. 2012, at http://money.howstuffworks.com/businesscommunications/how-to-leverage-an-api-for-conferencing1.htm.
Seagate, "Firmware Updates for Seagate Products," Author Unknown, published Feb. 2012 at http://knowledge.seagate.com/articles/enUS/FAQ/207931en.
Wikipedia, "Process identifier," dated Sep. 3, 2010, retrieved Jul. 9, 2015, from https://en.wikipedia.org/w/index.php?title=Process_identifier&oldid=382695536, 2 pages.
"Decision of Patent Grant, dated Nov. 1, 2017," Korean Patent Application No. 10-2017-7021593, filed Aug. 6, 2013, three pages.
"Notice on Grant of Patent Right for Invention, dated Nov. 17, 2017," Chinese Patent Application No. 201380042169.7, filed Aug. 6, 2013, two pages.
"Office Action dated Nov. 20, 2017," Canadian Patent Application No. 2881567, filed Aug. 6, 2013, 7 pages.
"Second Office Action dated Jan. 12, 2018," Chinese Patent Application No. 201380042170.X, filed Aug. 6, 2013, 8 pages.
Chinese Notice on the Third Office Action dated Mar. 19, 2018, Patent Application No. 201380042166.3, filed Aug. 6, 2013, 5 pages.
Extended European Search Report dated Mar. 5, 2018, European Patent Application No. 17196030.5, filed Oct. 11, 2017, 9 pages.
Canadian Office Action dated Apr. 17, 2018, Patent Application No. 2881490, filed Aug. 6, 2013, 4 pages.
Canadian Office Action dated Apr. 25, 2018, Patent Application No. 2881475, filed Aug. 6, 2013, 5 pages.
Chinese Decision on Rejection dated Sep. 5, 2018, Patent Application No. 201380042170.X, filed Aug. 6, 2013, 7 pages.
Japanese Notice of Rejection dated Jul. 24, 2018, Patent Application No. 2017-080044, filed Aug. 6, 2013, 2 pages.
Japanese Official Notice of Rejection dated Aug. 7, 2018, Patent Application No. 2017-152756, filed Aug. 6, 2013, 4 pages.
Singaporean Second Invitation to Respond to Written Opinion and Second Written Opinion dated Aug. 17, 2018, Patent Application No. 10201600997Y, filed Aug. 6, 2013, 6 pages.
European Communication Pursuant to Article 94(3) EPC dated Feb. 19, 2018, Patent Application No. 13827419.6, filed Aug. 6, 2013, 3 pages.
Japanese Official Notice of Rejection dated Jun. 5, 2018, Patent Application No. 2017-094235, filed Aug. 6, 2013, 3 pages.
Chinese Notice on Grant of Patent Right for Invention dated Sep. 26, 2018, Patent Application No. 201380042166.3, filed Aug. 6, 2013, 2 pages.
Canadian Office Action dated Jan. 21, 2019, Patent Application No. 2881567, filed Aug. 6, 2013, 4 pages.
Japanese Notice of Allowance dated Jan. 15, 2019, Patent Application No. 2017-080044, filed Aug. 6, 2013, 6 pages.
Korean Decision of Patent Grant dated Nov. 27, 2018, Patent Application No. 10-2015-7005788, filed Aug. 6, 2013, 3 pages.
European Communication under Rule 71(3) EPC dated Nov. 20, 2018, Patent Application No. 13827419.6, filed Aug. 6, 2013, 75 pages.

(56) References Cited

OTHER PUBLICATIONS

Canadian Notice of Allowance dated Apr. 24, 2019, Patent Application No. 2881475, filed Aug. 6, 2013, 1 page.
Canadian Notice of Allowance dated Mar. 8, 2019, Patent Application No. 2881490, filed Aug. 6, 2013, 1 page.
Chinese Third Office Action dated Aug. 30, 2019, Patent Application No. 201380042170.X, filed Aug. 6, 2013, 5 pages.
Indian First Examination Report dated Aug. 26, 2019, Patent Application No. 1684/DELNP/2015, filed Aug. 6, 2013, 6 pages.
Australian Examination Report No. 1 dated Oct. 16, 2019, Patent Application No. 2018204309, filed Aug. 6, 2013, 5 pages.
Indian First Examination Report dated Nov. 26, 2019, Patent Application No. 1689/DELP/2015, filed Aug. 6, 2013, 6 pages.
Indian First Examination Report dated Nov. 27, 2019, Patent Application No. 1686/DELNP/2015, filed Aug. 6, 2013, 7 pages.
Storer et al., "Potshards—A secure, Recoverable, Long-Term Archival Storage System," ACM Transactions on Storage, Published Jun. 2009, vol. 5, No. 2, Article 5, pages 5:1 to 5:35.

\* cited by examiner

SYSTEMS AND TECHNIQUES FOR DATA RECOVERY IN A KEYMAPLESS DATA STORAGE SYSTEM

BACKGROUND

Data storage systems can be complex, especially when configured to handle large amounts of data. Such systems may comprise multiple subsystems that communicate with one another over a network and that collectively operate to store data and service requests related to the storage of data, such as requests to store or retrieve data. Further, data storage systems are often configured to provide some level of assurances with respect to data durability. Those who utilize data storage systems, for example, typically want the ability to retrieve data at a later time. Accordingly, data storage systems are often configured to utilize redundancy and other techniques to lower the risk of data becoming irretrievable. Despite best efforts, however, the complexity of data storage systems can provide challenges for maintaining data durability. Hardware or software malfunction, programming errors, and malicious behavior, for example, can increase the risk of data loss. Moreover, goals of cost effectiveness and efficiency can often compete with goals for data durability.

BRIEF DESCRIPTION OF THE DRAWINGS

Various embodiments in accordance with the present disclosure will be described with reference to the drawings, in which.

DETAILED DESCRIPTION

Figure 1:
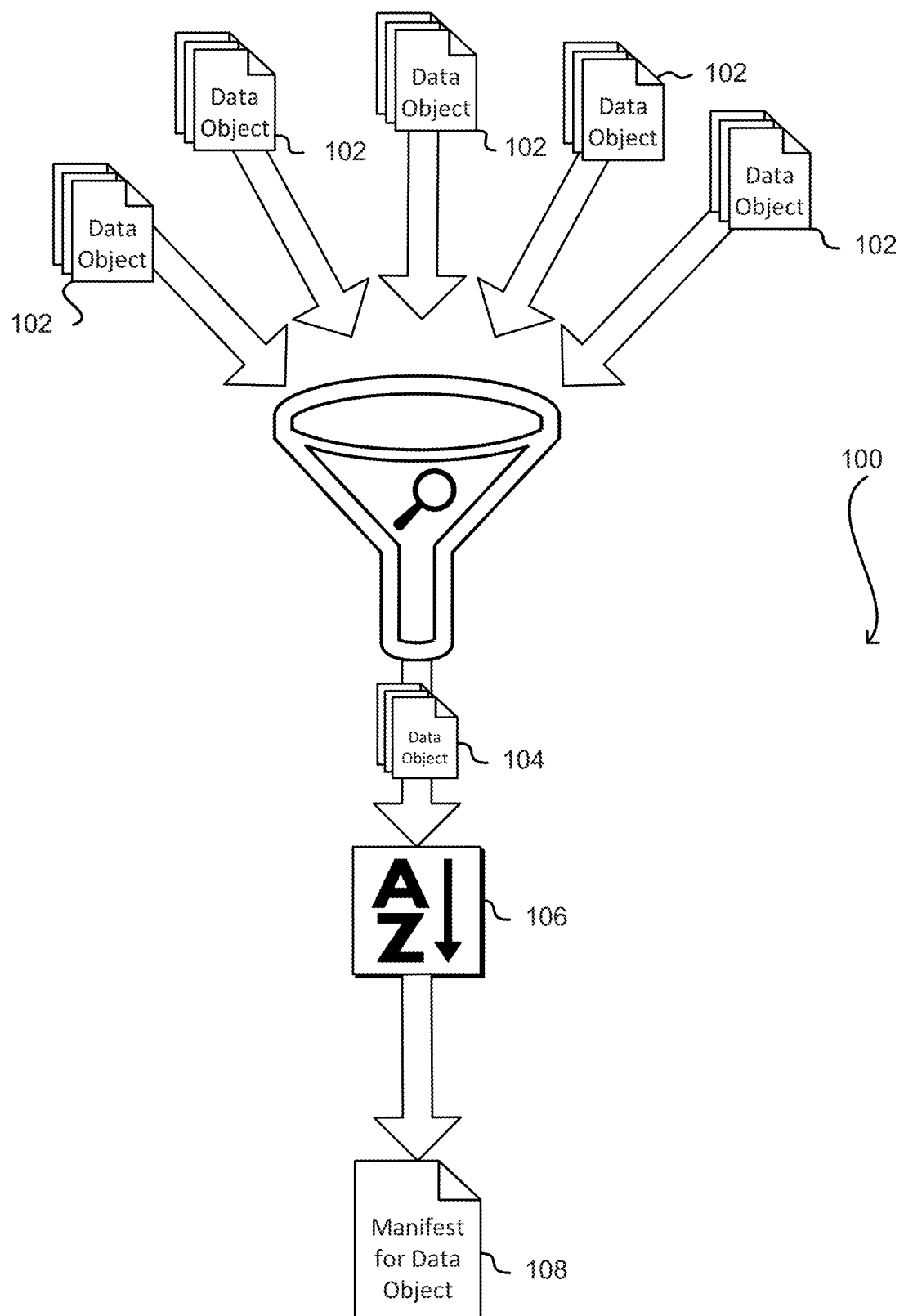
FIG. 1 is a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments of the present disclosure allow for restoration of the ability to locate data objects in a data storage system despite loss of information indicating where, in the data storage system, the data objects are stored. In many embodiments, a data storage system operates without the use of a keymap, which may be a database that associates identifiers of data objects (data object identifiers) with information identifying where to find the data objects in the data storage system. An example data storage system is described below in connection with FIG. 2. Instead of a keymap, locations of data objects in the data storage system may be encoded by the identifiers themselves. In this manner, an identifier may be decoded to obtain location information that is usable to locate and retrieve a corresponding data object.

For at least some data objects stored by a data storage system, various embodiments of the present disclosure utilize various techniques for improving system performance. For instance, in some embodiments, at least some data objects are stored in parts (components) distributed about the data storage devices of the data storage system. Storage in this manner provides technical advantages, such as the ability to take advantage of parallelism to allow for quicker retrieval of data objects than would be possible if the data objects were stored as complete units, and/or to create lower cost redundancy for data storage. The parts of a data object may be subsequences of a sequence of bits that comprise the data, shards produced during implementation of a coding scheme used to redundantly store the data object, subsequences of bits of an encrypted version of the data object, and/or other components of the data object that individually do not contain enough information to construct the data object. For data objects stored in such a manner, a data object identifier for the data object may include location information that points to a manifest file. The manifest file may include location information for the various parts of the data object. In this manner, when a data object identifier for a data object references a manifest file, the manifest file may be used to locate the parts of the data object to reconstruct the data object.

To improve user experience, various embodiments of the present disclosure allow users of a data storage system (e.g., customers of a computing resource provider that provides use of a data storage system as a service), to provide data objects to the data storage system without first specifying the size of the data object and/or the number of parts of the data object. For example, a user (e.g., a human operator or automated process) may upload an approximately 500 GB data object to the data storage system in 1 MB pieces, where the last piece may be less than 1 MB. For various reasons, the user may not want to or be able to provide the size of the data object a priori. For instance, the user may upload the data as it is generated and/or collected and, therefore, may not know the size of the data object at the time the upload is generated. In various embodiments, a data storage system is configured to allocate space for the manifest before a size of the manifest is known (e.g., because it is still unknown how many parts a data object will have). To do this, the data storage system may allocate enough space to accommodate the largest manifest file that the data storage system is configured to accommodate. As a result, many manifest files may have an unnecessarily large amount of space allocated, thereby wasting system resources until garbage collection processes are able to reclaim the allocated but unused space.

To address this, in various embodiments, historical data collected in connection with use of the data storage system may be used to calculate projected costs of storing the manifest files in the data storage system versus the projected costs of storing the manifest files in another data storage system that does not require space for the manifest file to be allocated a priori. Based on cost projections, manifest files may be stored in another data storage system when projected costs indicate that it would be less expensive to do so. For example, provided that the average number of parts of data objects to the maximum number of parts ratio is higher than the ratio of cost for allocating storage space for a maximum-size manifest in the data storage system 606 to the cost of storing an actual-size manifest in the data storage system 610, it may be economically advantageous to store data objects externally. In some embodiments, all manifest files are stored in the other data storage system, although in various other embodiments, manifests may be selectively stored in the other data storage system based on additional information available to make improved cost projections for particular data objects. For example, in the context of customers of a computing resource provider, historical use of the data storage system may indicate that, for one customer, storage of manifests in the other data storage system is more economical (e.g., because the customer, on average, stores relatively small data objects, resulting in a relatively large amounts of unused but allocated storage space for corresponding data objects) whereas, for another customer, storage of manifests in the other data storage system is not economical (e.g., because the other customer stores relatively large data objects that result in relatively less unused but allocated storage space for manifests of corresponding data objects).

Use of another data storage system for manifest storage, however, may introduce additional risks to data security. For example, the other data storage system may be configured differently, resulting in different characteristics relating to data durability or at least additional risks that are not present if manifests are stored in the same data storage system in which the corresponding data objects are stored. For example, relying on another data storage system to store manifests can introduce the risk of correlated failures, such as a failure of a data storage system (e.g., due to system malfunction or a security breach) storing manifests causing an inability to access data in the data storage system storing the corresponding data objects. To address the additional risks, but still be able to access data objects should manifest files become inaccessible, embodiments of the present disclosure allow for recovery of information from inaccessible manifest files.

For example, in various embodiments of the present disclosure, a data storage system is configured to store or otherwise have available various clues about the composition of a data object and, in particular, how the data object is stored in the data storage system. Some of the clues may be explicitly stored in association with the data object or otherwise available, e.g. by being encoded in a data object identifier of the data object. Such clues may include, for example, a timestamp of when the data object was uploaded to the data storage system, one or more hash values computed during generation of a tree hash of the data object, and/or other information. Other clues may be implicit to the data storage system, such as clues that are implicit by the data storage system's configuration. For instance, in some embodiments, components of a data object stored throughout a data storage system are required to be of equal size except for perhaps a single component of the data object since most data objects will not have a size that is an integer multiple of a component size. For example, a 5.5 GB data object stored as 1 GB components may have five 1 GB components and one 0.5 GB component. It should be noted that the components of a data object stored by a data storage system may have a different size than components of the data object that were uploaded to the data storage system. As an illustrative example, a data object may be uploaded in 1 MB pieces but stored in a data storage system in 1 GB pieces.

In various embodiments, clues related to a data object are used to regenerate a manifest for the data object when an original manifest for the data object becomes inaccessible. For example, clues may be used to search for potential components of the data object, thereby separating potential components of the data object from other data objects stored by the data storage system. For example, clues may be used to identify data objects stored by the data storage system that were all stored on the same day as the data object for which the manifest became inaccessible and that have the same size (except for a data object stored on the same day and having a smaller size than the other data objects). In many embodiments and/or circumstances, the clues are sufficient to locate a portion of the components of the data object and other clues, e.g. hashes (such as checksums), may be used to determine how the data objects should be put together to construct the data object. For example, if a clue includes a tree hash, hashes of the components can be used in different orderings to generate a tree hash until an ordering is found that results in the tree hash available as a clue. In embodiments and/or circumstances where the clues are insufficient to narrow the search space to the components of the data object, similar techniques may be utilized to determine the correct components and their ordering.

FIG. 1 shows a diagram 100 illustrating various aspects of the present disclosure. As noted above, various embodiments of the present disclosure involve storage of data objects as several parts distributed throughout a data storage system, such as by storing the parts in different physical storage devices of the data storage system. In such embodiments, records (manifests) about the location of the parts of data objects are maintained. In the event of the loss of one of the records, various embodiments of the present disclosure are directed to recovery of a corresponding data object. For example, if a record for a data object is lost, the components of the data object stored throughout a distributed system may nevertheless be stored in the distributed system and, therefore, recoverable and usable to regenerate lost records. Various embodiments of the present disclosure therefore are directed to locating the various components of the data object and recreating records to enable reconstruction of the data object.

In an embodiment, the components of a data object are themselves treated as data objects in a data storage system. The data storage system may store multiple data objects 102 throughout various devices that comprise the system, such as throughout drives. The data objects 102 may be complete data objects or components of larger data objects, as described in more detail below. In other words, the data objects 102 may be, from a user perspective, complete or may be sub-objects of larger data objects. As illustrated in FIG. 1, information describing the components of a data object in a data storage system may be recovered by searching the data objects 102 stored by the data storage system to locate the components 104 of the data object. Various criteria may be used to distinguish data objects that are part of the data object at issue from other data objects stored by the data storage system. For example, information may be maintained by the data storage system about when the data object was created in the data storage system (e.g., when the data object was received to the data storage system by a user of the data storage system), the size of components of the data object, check sums of the data object, and/or other information from which the components of the data object may be distinguished from other data objects.

In an embodiment, as illustrated in FIG. 1, once components 104 of the data object are identified, the components may be sorted according to the order in which they appear in the data object. Sorting 106 the components of the data object may be performed in various ways in accordance with various embodiments. For example, in some embodiments, a tree hash of the data object is available, such as from a data object identifier for the data object or from metadata stored for the data object by the data storage system. The tree hash may be formed based, at least in part, on the components 104 of the data object. Various orderings of the components 104 of the data object may be used to generate tree hashes until a match of the tree hash of the data object is found. It should be noted that, while not illustrated in FIG. 1, the components 104 may include components that are not part of the data object, such as if searching the data objects 102 does not result in completely distinguishing components of the data object from other data objects. In such instances, additional combinations of orderings that include components from other data objects may be tried to find not only a correct ordering, but selection of the correct components from a plurality of potential components.

When a match is found, the match indicates the correct ordering with high probability due to the unlikely occurrence of a hash collision found in generation of a tree hash. Accordingly, once the components 104 of the data object have been sorted 106, a manifest 108 for the data object may be generated and stored. Other operations may also be performed, such as providing the data object itself or performing other operations, as appropriate by context.

Figure 2:
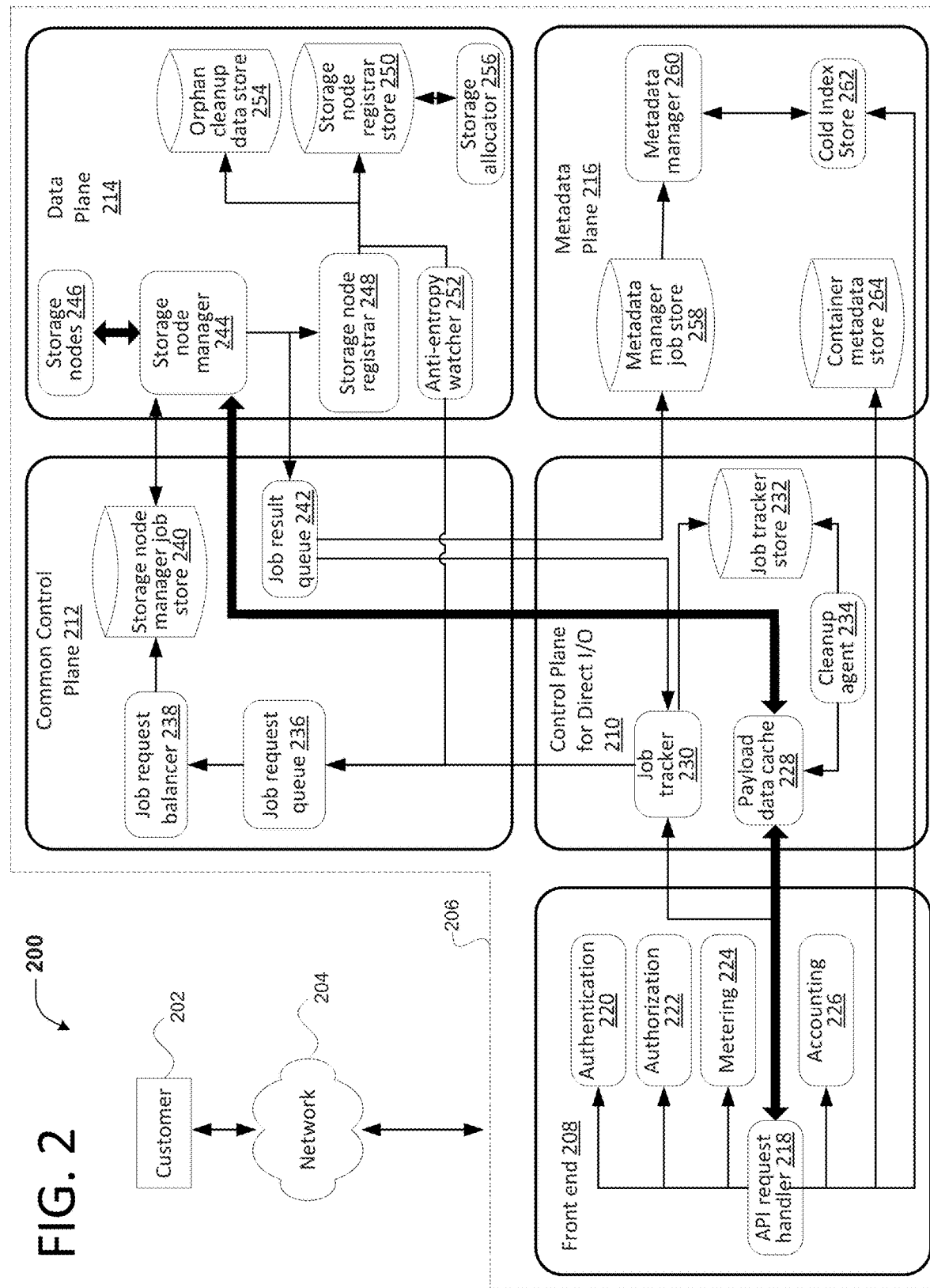
FIG. 2 shows an illustrative example of an environment in which various embodiments may be practiced.

FIG. 2 illustrates an example environment 200 in which an archival data storage system may be implemented, in accordance with at least one embodiment and which may be used in accordance with the various embodiments of the present disclosure. One or more customers 202 connect, via a network 204, to an archival data storage system 206. As implied above, unless otherwise clear from context, the term "customer" refers to the system(s) of a customer entity (such as an individual, company or other organization) that utilizes data storage services described herein. Such systems may include datacenters, mainframes, individual computing devices, distributed computing environments and customer-accessible instances thereof or any other system capable of communicating with the archival data storage system. In some embodiments, a customer may refer to a machine instance (e.g., with direct hardware access) or virtual instance of a distributed computing system provided by a computing resource provider that also provides the archival data storage system. In some embodiments, the archival data storage system is integral to the distributed computing system and may include or be implemented by an instance, virtual or machine, of the distributed computing system. In various embodiments, network 204 may include the Internet, a local area network ("LAN"), a wide area network ("WAN"), a cellular data network and/or other data network.

In an embodiment, archival data storage system 206 provides a multi-tenant or multi-customer environment where each tenant or customer may store, retrieve, delete or otherwise manage data in a data storage space allocated to the customer. In some embodiments, an archival data storage system 206 comprises multiple subsystems or "planes" that each provides a particular set of services or functionalities. For example, as illustrated in FIG. 2, archival data storage system 206 includes front end 208, control plane for direct I/O 210, common control plane 212, data plane 214 and metadata plane 216. Each subsystem or plane may comprise one or more components that collectively provide the particular set of functionalities. Each component may be implemented by one or more physical and/or logical computing devices, such as computers, data storage devices and the like. Components within each subsystem may communicate with components within the same subsystem, components in other subsystems or external entities such as customers. At least some of such interactions are indicated by arrows in FIG. 2. In particular, the main bulk data transfer paths in and out of archival data storage system 206 are denoted by bold arrows. It will be appreciated by those of ordinary skill in the art that various embodiments may have fewer or a greater number of systems, subsystems and/or subcomponents than are illustrated in FIG. 2. Thus, the depiction of environment 200 in FIG. 2 should be taken as being illustrative in nature and not limiting to the scope of the disclosure.

In the illustrative embodiment, front end 208 implements a group of services that provides an interface between the archival data storage system 206 and external entities, such as one or more customers 202 described herein. In various embodiments, front end 208 provides an application programming interface ("API") to enable a user to programmatically interface with the various features, components and capabilities of the archival data storage system. Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof.

Capabilities provided by archival data storage system 206 may include data storage, data retrieval, data deletion, metadata operations, configuration of various operational parameters and the like. Metadata operations may include requests to retrieve catalogs of data stored for a particular customer, data recovery requests, job inquires and the like. Configuration APIs may allow customers to configure account information, audit logs, policies, notifications settings and the like. A customer may request the performance of any of the above operations by sending API requests to the archival data storage system. Similarly, the archival data storage system may provide responses to customer requests. Such requests and responses may be submitted over any suitable communications protocol, such as Hypertext Transfer Protocol ("HTTP"), File Transfer Protocol ("FTP") and the like, in any suitable format, such as REpresentational State Transfer ("REST"), Simple Object Access Protocol ("SOAP") and the like. The requests and responses may be encoded, for example, using Base64 encoding, encrypted with a cryptographic key or the like.

In some embodiments, archival data storage system 206 allows customers to create one or more logical structures such as a logical data containers in which to store one or more archival data objects. As used herein, data object is used broadly and does not necessarily imply any particular structure or relationship to other data. A data object may be, for instance, simply a sequence of bits. Typically, such logical data structures may be created to meeting certain business requirements of the customers and are independently of the physical organization of data stored in the archival data storage system. As used herein, the term "logical data container" refers to a grouping of data objects. For example, data objects created for a specific purpose or during a specific period of time may be stored in the same logical data container. Each logical data container may include nested data containers or data objects and may be associated with a set of policies such as size limit of the container, maximum number of data objects that may be stored in the container, expiration date, access control list and the like. In various embodiments, logical data containers may be created, deleted or otherwise modified by customers via API requests, by a system administrator or by the data storage system, for example, based on configurable information. For example, the following HTTP PUT request may be used, in an embodiment, to create a logical data container with name "logical-container-name" associated with a customer identified by an account identifier "accountId".
PUT/{accountId}/logical-container-name HTTP/1.1

In an embodiment, archival data storage system 206 provides the APIs for customers to store data objects into logical data containers. For example, the following HTTP POST request may be used, in an illustrative embodiment, to store a data object into a given logical container. In an embodiment, the request may specify the logical path of the storage location, data length, reference to the data payload, a digital digest of the data payload and other information. In one embodiment, the APIs may allow a customer to upload multiple data objects to one or more logical data containers in one request. In another embodiment where the data object is large, the APIs may allow a customer to upload the data object in multiple parts, each with a portion of the data object.
POST/{accountId}/logical-container-name/data HTTP/1.1
Content-Length: 1124192
x-ABC-data-description: "annual-result-2012.xls"
x-ABC-md5-tree-hash: 634d9a0688aff95c In response to a data storage request, in an embodiment, archival data storage system 206 provides a data object identifier if the data object is stored successfully. Such data object identifier may be used to retrieve, delete or otherwise refer to the stored data object in subsequent requests. In some embodiments, such as data object identifier may be "self-describing" in that it includes (for example, with or without encryption) storage location information that may be used by the archival data storage system to locate the data object without the need for a additional data structures such as a global namespace key map. In addition, in some embodiments, data object identifiers may also encode other information such as payload digest, error-detection code, access control data and the other information that may be used to validate subsequent requests and data integrity. In some embodiments, the archival data storage system stores incoming data in a transient durable data store before moving it archival data storage. Thus, although customers may perceive that data is persisted durably at the moment when an upload request is completed, actual storage to a long-term persisted data store may not commence until sometime later (e.g., 12 hours later). In some embodiments, the timing of the actual storage may depend on the size of the data object, the system load during a diurnal cycle, configurable information such as a service-level agreement between a customer and a storage service provider and other factors.

In some embodiments, archival data storage system 206 provides the APIs for customers to retrieve data stored in the archival data storage system. In such embodiments, a customer may initiate a job to perform the data retrieval and may learn the completion of the job by a notification or by polling the system for the status of the job. As used herein, a "job" refers to a data-related activity corresponding to a customer request that may be performed temporally independently from the time the request is received. For example, a job may include retrieving, storing and deleting data, retrieving metadata and the like. A job may be identified by a job identifier that may be unique, for example, among all the jobs for a particular customer. For example, the following HTTP POST request may be used, in an illustrative embodiment, to initiate a job to retrieve a data object identified by a data object identifier "dataObjectId." In other embodiments, a data retrieval request may request the retrieval of multiple data objects, data objects associated with a logical data container and the like.
POST/{accountId}/logical-data-container-name/data/{dataObjectId} HTTP/1.1

In response to the request, in an embodiment, archival data storage system 206 provides a job identifier job-id," that is assigned to the job in the following response. The response provides, in this example, a path to the storage location where the retrieved data will be stored.
HTTP/1.1 202 ACCEPTED
Location: /{accountId}/logical-data-container-name/jobs/{job-id}

At any given point in time, the archival data storage system may have many jobs pending for various data operations. In some embodiments, the archival data storage system may employ job planning and optimization techniques such as batch processing, load balancing, job coalescence and the like, to optimize system metrics such as cost, performance, scalability and the like. In some embodiments, the timing of the actual data retrieval depends on factors such as the size of the retrieved data, the system load and capacity, active status of storage devices and the like. For example, in some embodiments, at least some data storage devices in an archival data storage system may be activated or inactivated according to a power management schedule, for example, to reduce operational costs. Thus, retrieval of data stored in a currently active storage device (such as a rotating hard drive) may be faster than retrieval of data stored in a currently inactive storage device (such as a spinned-down hard drive).

In an embodiment, when a data retrieval job is completed, the retrieved data is stored in a staging data store and made available for customer download. In some embodiments, a customer is notified of the change in status of a job by a configurable notification service. In other embodiments, a customer may learn of the status of a job by polling the system using a job identifier. The following HTTP GET request may be used, in an embodiment, to download data that is retrieved by a job identified by "job-id," using a download path that has been previously provided.
GET/{accountId}/logical-data-container-name/jobs/{job-id}/output HTTP/1.1

In response to the GET request, in an illustrative embodiment, archival data storage system 206 may provide the retrieved data in the following HTTP response, with a tree-hash of the data for verification purposes.
HTTP/1.1 200 OK
Content-Length: 1124192
x-ABC-archive-description: "retrieved stuff"
x-ABC-md5-tree-hash: 693d9a7838aff95c
[1112192 bytes of user data follows]

In an embodiment, a customer may request the deletion of a data object stored in an archival data storage system by specifying a data object identifier associated with the data object. For example, in an illustrative embodiment, a data object with data object identifier "dataObjectId" may be deleted using the following HTTP request. In another embodiment, a customer may request the deletion of multiple data objects such as those associated with a particular logical data container.

DELETE/{accountId}/logical-data-container-name/data/{dataObjectId} HTTP/1.1

In various embodiments, data objects may be deleted in response to a customer request or may be deleted automatically according to a user-specified or default expiration date. In some embodiments, data objects may be rendered inaccessible to customers upon an expiration time but remain recoverable during a grace period beyond the expiration time. In various embodiments, the grace period may be based on configurable information such as customer configuration, service-level agreement terms and the like. In some embodiments, a customer may be provided the abilities to query or receive notifications for pending data deletions and/or cancel one or more of the pending data deletions. For example, in one embodiment, a customer may set up notification configurations associated with a logical data container such that the customer will receive notifications of certain events pertinent to the logical data container. Such events may include the completion of a data retrieval job request, the completion of metadata request, deletion of data objects or logical data containers and the like.

In an embodiment, archival data storage system 206 also provides metadata APIs for retrieving and managing metadata such as metadata associated with logical data containers. In various embodiments, such requests may be handled asynchronously (where results are returned later) or synchronously (where results are returned immediately).

Still referring to FIG. 2, in an embodiment, at least some of the API requests discussed above are handled by API request handler 218 as part of front end 208. For example, API request handler 218 may decode and/or parse an incoming API request to extract information, such as uniform resource identifier ("URI"), requested action and associated parameters, identity information, data object identifiers and the like. In addition, API request handler 218 invoke other services (described below), where necessary, to further process the API request.

In an embodiment, front end 208 includes an authentication service 220 that may be invoked, for example, by API handler 218, to authenticate an API request. For example, in some embodiments, authentication service 220 may verify identity information submitted with the API request such as username and password Internet Protocol ("IP") address, cookies, digital certificate, digital signature and the like. In other embodiments, authentication service 220 may require the customer to provide additional information or perform additional steps to authenticate the request, such as required in a multifactor authentication scheme, under a challenge-response authentication protocol and the like.

In an embodiment, front end 208 includes an authorization service 222 that may be invoked, for example, by API handler 218, to determine whether a requested access is permitted according to one or more policies determined to be relevant to the request. For example, in one embodiment, authorization service 222 verifies that a requested access is directed to data objects contained in the requestor's own logical data containers or which the requester is otherwise authorized to access. In some embodiments, authorization service 222 or other services of front end 208 may check the validity and integrity of a data request based at least in part on information encoded in the request, such as validation information encoded by a data object identifier.

In an embodiment, front end 208 includes a metering service 224 that monitors service usage information for each customer such as data storage space used, number of data objects stored, data requests processed and the like. In an embodiment, front end 208 also includes accounting service 226 that performs accounting and billing-related functionalities based, for example, on the metering information collected by the metering service 224, customer account information and the like. For example, a customer may be charged a fee based on the storage space used by the customer, size and number of the data objects, types and number of requests submitted, customer account type, service level agreement the like.

In an embodiment, front end 208 batch processes some or all incoming requests. For example, front end 208 may wait until a certain number of requests has been received before processing (e.g., authentication, authorization, accounting and the like) the requests. Such a batch processing of incoming requests may be used to gain efficiency.

In some embodiments, front end 208 may invoke services provided by other subsystems of the archival data storage system to further process an API request. For example, front end 208 may invoke services in metadata plane 216 to fulfill metadata requests. For another example, front end 208 may stream data in and out of control plane for direct I/O 210 for data storage and retrieval requests, respectively.

Referring now to control plane for direct I/O 210 illustrated in FIG. 2, in various embodiments, control plane for direct I/O 210 provides services that create, track and manage jobs created as a result of customer requests. As discussed above, a job refers to a customer-initiated activity that may be performed asynchronously to the initiating request, such as data retrieval, storage, metadata queries or the like. In an embodiment, control plane for direct I/O 210 includes a job tracker 230 that is configured to create job records or entries corresponding to customer requests, such as those received from API request handler 218, and monitor the execution of the jobs. In various embodiments, a job record may include information related to the execution of a job such as a customer account identifier, job identifier, data object identifier, reference to payload data cache 228 (described below), job status, data validation information and the like. In some embodiments, job tracker 230 may collect information necessary to construct a job record from multiple requests. For example, when a large amount of data is requested to be stored, data upload may be broken into multiple requests, each uploading a portion of the data. In such a case, job tracker 230 may maintain information to keep track of the upload status to ensure that all data parts have been received before a job record is created. In some embodiments, job tracker 230 also obtains a data object identifier associated with the data to be stored and provides the data object identifier, for example, to a front end service to be returned to a customer. In an embodiment, such data object identifier may be obtained from data plane 214 services such as storage node manager 244, storage node registrar 248, and the like, described below.

In some embodiments, control plane for direct I/O 210 includes a job tracker store 232 for storing job entries or records. In various embodiments, job tracker store 232 may be implemented by a NoSQL data management system, such as a key-value data store, a relational database management system ("RDBMS") or any other data storage system. In some embodiments, data stored in job tracker store 232 may be partitioned to enable fast enumeration of jobs that belong to a specific customer, facilitate efficient bulk record deletion, parallel processing by separate instances of a service and the like. For example, job tracker store 232 may implement tables that are partitioned according to customer account identifiers and that use job identifiers as range keys. In an embodiment, job tracker store 232 is further sub-partitioned based on time (such as job expiration time) to facilitate job expiration and cleanup operations. In an embodiment, transactions against job tracker store 232 may be aggregated to reduce the total number of transactions. For example, in some embodiments, a job tracker 230 may perform aggregate multiple jobs corresponding to multiple requests into one single aggregated job before inserting it into job tracker store 232.

In an embodiment, job tracker 230 is configured to submit the job for further job scheduling and planning, for example, by services in common control plane 212. Additionally, job tracker 230 may be configured to monitor the execution of jobs and update corresponding job records in job tracker store 232 as jobs are completed. In some embodiments, job tracker 230 may be further configured to handle customer queries such as job status queries. In some embodiments, job tracker 230 also provides notifications of job status changes to customers or other services of the archival data storage system. For example, when a data retrieval job is completed, job tracker 230 may cause a customer to be notified (for example, using a notification service) that data is available for download. As another example, when a data storage job is completed, job tracker 230 may notify a cleanup agent 234 to remove payload data associated with the data storage job from a transient payload data cache 228, described below.

In an embodiment, control plane for direct I/O 210 includes a payload data cache 228 for providing transient data storage services for payload data transiting between data plane 214 and front end 208. Such data includes incoming data pending storage and outgoing data pending customer download. As used herein, transient data store is used interchangeably with temporary or staging data store to refer to a data store that is used to store data objects before they are stored in an archival data storage described herein or to store data objects that are retrieved from the archival data storage. A transient data store may provide volatile or non-volatile (durable) storage. In most embodiments, while potentially usable for persistently storing data, a transient data store is intended to store data for a shorter period of time than an archival data storage system and may be less cost-effective than the data archival storage system described herein. In one embodiment, transient data storage services provided for incoming and outgoing data may be differentiated. For example, data storage for the incoming data, which is not yet persisted in archival data storage, may provide higher reliability and durability than data storage for outgoing (retrieved) data, which is already persisted in archival data storage. In another embodiment, transient storage may be optional for incoming data, that is, incoming data may be stored directly in archival data storage without being stored in transient data storage such as payload data cache 228, for example, when there is the system has sufficient bandwidth and/or capacity to do so.

In an embodiment, control plane for direct I/O 210 also includes a cleanup agent 234 that monitors job tracker store 232 and/or payload data cache 228 and removes data that is no longer needed. For example, payload data associated with a data storage request may be safely removed from payload data cache 228 after the data is persisted in permanent storage (e.g., data plane 214). On the reverse path, data staged for customer download may be removed from payload data cache 228 after a configurable period of time (e.g., 30 days since the data is staged) or after a customer indicates that the staged data is no longer needed.

In some embodiments, cleanup agent 234 removes a job record from job tracker store 232 when the job status indicates that the job is complete or aborted. As discussed above, in some embodiments, job tracker store 232 may be partitioned to enable to enable faster cleanup. In one embodiment where data is partitioned by customer account identifiers, cleanup agent 234 may remove an entire table that stores jobs for a particular customer account when the jobs are completed instead of deleting individual jobs one at a time. In another embodiment where data is further sub-partitioned based on job expiration time cleanup agent 234 may bulk-delete a whole partition or table of jobs after all the jobs in the partition expire. In other embodiments, cleanup agent 234 may receive instructions or control messages (such as indication that jobs are completed) from other services such as job tracker 230 that cause the cleanup agent 234 to remove job records from job tracker store 232 and/or payload data cache 228.

Referring now to common control plane 212 illustrated in FIG. 2. In various embodiments, common control plane 212 provides a queue-based load leveling service to dampen peak to average load levels (jobs) coming from control plane for I/O 210 and to deliver manageable workload to data plane 214. In an embodiment, common control plane 212 includes a job request queue 236 for receiving jobs created by job tracker 230 in control plane for direct I/O 210, described above, a storage node manager job store 240 from which services from data plane 214 (e.g., storage node managers 244) pick up work to execute and a request balancer 238 for transferring job items from job request queue 236 to storage node manager job store 240 in an intelligent manner.

In an embodiment, job request queue 236 provides a service for inserting items into and removing items from a queue (e.g., first-in-first-out (FIFO) or first-in-last-out (FILO)), a set or any other suitable data structure. Job entries in the job request queue 236 may be similar to or different from job records stored in job tracker store 232, described above.

In an embodiment, common control plane 212 also provides a durable high efficiency job store, storage node manager job store 240, that allows services from data plane 214 (e.g., storage node manager 244, anti-entropy watcher 252) to perform job planning optimization, check pointing and recovery. For example, in an embodiment, storage node manager job store 240 allows the job optimization such as batch processing, operation coalescing and the like by supporting scanning, querying, sorting or otherwise manipulating and managing job items stored in storage node manager job store 240. In an embodiment, a storage node manager 244 scans incoming jobs and sort the jobs by the type of data operation (e.g., read, write or delete), storage locations (e.g., volume, disk), customer account identifier and the like. The storage node manager 244 may then reorder, coalesce, group in batches or otherwise manipulate and schedule the jobs for processing. For example, in one embodiment, the storage node manager 244 may batch process all the write operations before all the read and delete operations. In another embodiment, the storage node manager 224 may perform operation coalescing. For another example, the storage node manager 224 may coalesce multiple retrieval jobs for the same object into one job or cancel a storage job and a deletion job for the same data object where the deletion job comes after the storage job.

In an embodiment, storage node manager job store 240 is partitioned, for example, based on job identifiers, so as to allow independent processing of multiple storage node managers 244 and to provide even distribution of the incoming workload to all participating storage node managers 244. In various embodiments, storage node manager job store 240 may be implemented by a NoSQL data management system, such as a key-value data store, a RDBMS or any other data storage system.

In an embodiment, request balancer 238 provides a service for transferring job items from job request queue 236 to storage node manager job store 240 so as to smooth out variation in workload and to increase system availability. For example, request balancer 238 may transfer job items from job request queue 236 at a lower rate or at a smaller granularity when there is a surge in job requests coming into the job request queue 236 and vice versa when there is a lull in incoming job requests so as to maintain a relatively sustainable level of workload in the storage node manager store 240. In some embodiments, such sustainable level of workload is around the same or below the average workload of the system.

In an embodiment, job items that are completed are removed from storage node manager job store 240 and added to the job result queue 242. In an embodiment, data plane 214 services (e.g., storage node manager 244) are responsible for removing the job items from the storage node manager job store 240 and adding them to job result queue 242. In some embodiments, job request queue 242 is implemented in a similar manner as job request queue 235, discussed above.

Referring now to data plane 214 illustrated in FIG. 2. In various embodiments, data plane 214 provides services related to long-term archival data storage, retrieval and deletion, data management and placement, anti-entropy operations and the like. In various embodiments, data plane 214 may include any number and type of storage entities such as data storage devices (such as tape drives, hard disk drives, solid state devices, and the like), storage nodes or servers, datacenters and the like. Such storage entities may be physical, virtual or any abstraction thereof (e.g., instances of distributed storage and/or computing systems) and may be organized into any topology, including hierarchical or tiered topologies. Similarly, the components of the data plane may be dispersed, local or any combination thereof. For example, various computing or storage components may be local or remote to any number of datacenters, servers or data storage devices, which in turn may be local or remote relative to one another. In various embodiments, physical storage entities may be designed for minimizing power and cooling costs by controlling the portions of physical hardware that are active (e.g., the number of hard drives that are actively rotating). In an embodiment, physical storage entities implement techniques, such as Shingled Magnetic Recording (SMR), to increase storage capacity.

In an environment illustrated by FIG. 2, one or more storage node managers 244 each controls one or more storage nodes 246 by sending and receiving data and control messages. Each storage node 246 in turn controls a (potentially large) collection of data storage devices such as hard disk drives. In various embodiments, a storage node manager 244 may communicate with one or more storage nodes 246 and a storage node 246 may communicate with one or more storage node managers 244. In an embodiment, storage node managers 244 are implemented by one or more computing devices that are capable of performing relatively complex computations such as digest computation, data encoding and decoding, job planning and optimization and the like. In some embodiments, storage nodes 244 are implemented by one or more computing devices with less powerful computation capabilities than storage node managers 244. Further, in some embodiments the storage node manager 244 may not be included in the data path. For example, data may be transmitted from the payload data cache 228 directly to the storage nodes 246 or from one or more storage nodes 246 to the payload data cache 228. In this way, the storage node manager 244 may transmit instructions to the payload data cache 228 and/or the storage nodes 246 without receiving the payloads directly from the payload data cache 228 and/or storage nodes 246. In various embodiments, a storage node manager 244 may send instructions or control messages to any other components of the archival data storage system 206 described herein to direct the flow of data.

In an embodiment, a storage node manager 244 serves as an entry point for jobs coming into and out of data plane 214 by picking job items from common control plane 212 (e.g., storage node manager job store 240), retrieving staged data from payload data cache 228 and performing necessary data encoding for data storage jobs and requesting appropriate storage nodes 246 to store, retrieve or delete data. Once the storage nodes 246 finish performing the requested data operations, the storage node manager 244 may perform additional processing, such as data decoding and storing retrieved data in payload data cache 228 for data retrieval jobs, and update job records in common control plane 212 (e.g., removing finished jobs from storage node manager job store 240 and adding them to job result queue 242).

In an embodiment, storage node manager 244 performs data encoding according to one or more data encoding schemes before data storage to provide data redundancy, security and the like. Such data encoding schemes may include encryption schemes, redundancy encoding schemes such as erasure encoding, redundant array of independent disks (RAID) encoding schemes, replication and the like. Likewise, in an embodiment, storage node managers 244 performs corresponding data decoding schemes, such as decryption, erasure-decoding and the like, after data retrieval to restore the original data.

As discussed above in connection with storage node manager job store 240, storage node managers 244 may implement job planning and optimizations such as batch processing, operation coalescing and the like to increase efficiency. In some embodiments, jobs are partitioned among storage node managers so that there is little or no overlap between the partitions. Such embodiments facilitate parallel processing by multiple storage node managers, for example, by reducing the probability of racing or locking.

In various embodiments, data plane 214 is implemented to facilitate data integrity. For example, storage entities handling bulk data flows such as storage nodes managers 244 and/or storage nodes 246 may validate the digest of data stored or retrieved, check the error-detection code to ensure integrity of metadata and the like.

In various embodiments, data plane 214 is implemented to facilitate scalability and reliability of the archival data storage system. For example, in one embodiment, storage node managers 244 maintain no or little internal state so that they can be added, removed or replaced with little adverse impact. In one embodiment, each storage device is a self-contained and self-describing storage unit capable of providing information about data stored thereon. Such information may be used to facilitate data recovery in case of data loss. Furthermore, in one embodiment, each storage node 246 is capable of collecting and reporting information about the storage node including the network location of the storage node and storage information of connected storage devices to one or more storage node registrars 248 and/or storage node registrar stores 250. In some embodiments, storage nodes 246 perform such self-reporting at system start up time and periodically provide updated information. In various embodiments, such a self-reporting approach provides dynamic and up-to-date directory information without the need to maintain a global namespace key map or index which can grow substantially as large amounts of data objects are stored in the archival data system.

In an embodiment, data plane 214 may also include one or more storage node registrars 248 that provide directory information for storage entities and data stored thereon, data placement services and the like. Storage node registrars 248 may communicate with and act as a front end service to one or more storage node registrar stores 250, which provide storage for the storage node registrars 248. In various embodiments, storage node registrar store 250 may be implemented by a NoSQL data management system, such as a key-value data store, a RDBMS or any other data storage system. In some embodiments, storage node registrar stores 250 may be partitioned to enable parallel processing by multiple instances of services. As discussed above, in an embodiment, information stored at storage node registrar store 250 is based at least partially on information reported by storage nodes 246 themselves.

In some embodiments, storage node registrars 248 provide directory service, for example, to storage node managers 244 that want to determine which storage nodes 246 to contact for data storage, retrieval and deletion operations. For example, given a volume identifier provided by a storage node manager 244, storage node registrars 248 may provide, based on a mapping maintained in a storage node registrar store 250, a list of storage nodes that host volume components corresponding to the volume identifier. Specifically, in one embodiment, storage node registrar store 250 stores a mapping between a list of identifiers of volumes or volume components and endpoints, such as Domain Name System (DNS) names, of storage nodes that host the volumes or volume components.

As used herein, a "volume" refers to a logical storage space within a data storage system in which data objects may be stored. A volume may be identified by a volume identifier. A volume may reside in one physical storage device (e.g., a hard disk) or span across multiple storage devices. In the latter case, a volume comprises a plurality of volume components each residing on a different storage device. As used herein, a "volume component" refers a portion of a volume that is physically stored in a storage entity such as a storage device. Volume components for the same volume may be stored on different storage entities. In one embodiment, when data is encoded by a redundancy encoding scheme (e.g., erasure coding scheme, RAID, replication), each encoded data component or "shard" may be stored in a different volume component to provide fault tolerance and isolation. In some embodiments, a volume component is identified by a volume component identifier that includes a volume identifier and a shard slot identifier. As used herein, a shard slot identifies a particular shard, row or stripe of data in a redundancy encoding scheme. For example, in one embodiment, a shard slot corresponds to an erasure coding matrix row. In some embodiments, storage node registrar store 250 also stores information about volumes or volume components such as total, used and free space, number of data objects stored and the like.

In some embodiments, data plane 214 also includes a storage allocator 256 for allocating storage space (e.g., volumes) on storage nodes to store new data objects, based at least in part on information maintained by storage node registrar store 250, to satisfy data isolation and fault tolerance constraints. In some embodiments, storage allocator 256 requires manual intervention.

In some embodiments, data plane 214 also includes an anti-entropy watcher 252 for detecting entropic effects and initiating anti-entropy correction routines. For example, anti-entropy watcher 252 may be responsible for monitoring activities and status of all storage entities such as storage nodes, reconciling live or actual data with maintained data and the like. In various embodiments, entropic effects include, but are not limited to, performance degradation due to data fragmentation resulting from repeated write and rewrite cycles, hardware wear (e.g., of magnetic media), data unavailability and/or data loss due to hardware/software malfunction, environmental factors, physical destruction of hardware, random chance or other causes. Anti-entropy watcher 252 may detect such effects and in some embodiments may preemptively and/or reactively institute anti-entropy correction routines and/or policies.

In an embodiment, anti-entropy watcher 252 causes storage nodes 246 to perform periodic anti-entropy scans on storage devices connected to the storage nodes. Anti-entropy watcher 252 may also inject requests in job request queue 236 (and subsequently job result queue 242) to collect information, recover data and the like. In some embodiments, anti-entropy watcher 252 may perform scans, for example, on cold index store 262, described below, and storage nodes 246, to ensure referential integrity.

In an embodiment, information stored at storage node registrar store 250 is used by a variety of services such as storage node registrar 248, storage allocator 256, anti-entropy watcher 252 and the like. For example, storage node registrar 248 may provide data location and placement services (e.g., to storage node managers 244) during data storage, retrieval and deletion. For example, given the size of a data object to be stored and information maintained by storage node registrar store 250, a storage node registrar 248 may determine where (e.g., volume) to store the data object and provides an indication of the storage location of the data object which may be used to generate a data object identifier associated with the data object. As another example, in an embodiment, storage allocator 256 uses information stored in storage node registrar store 250 to create and place volume components for new volumes in specific storage nodes to satisfy isolation and fault tolerance constraints. As yet another example, in an embodiment, anti-entropy watcher 252 uses information stored in storage node registrar store 250 to detect entropic effects such as data loss, hardware failure and the like.

In some embodiments, data plane 214 also includes an orphan cleanup data store 254, which is used to track orphans in the storage system. As used herein, an orphan is a stored data object that is not referenced by any external entity. In various embodiments, orphan cleanup data store 254 may be implemented by a NoSQL data management system, such as a key-value data store, an RDBMS or any other data storage system. In some embodiments, storage node registrars 248 stores object placement information in orphan cleanup data store 254. Subsequently, information stored in orphan cleanup data store 254 may be compared, for example, by an anti-entropy watcher 252, with information maintained in metadata plane 216. If an orphan is detected, in some embodiments, a request is inserted in the common control plane 212 to delete the orphan.

Referring now to metadata plane 216 illustrated in FIG. 2. In various embodiments, metadata plane 216 provides information about data objects stored in the system for inventory and accounting purposes, to satisfy customer metadata inquiries and the like. In the illustrated embodiment, metadata plane 216 includes a metadata manager job store 258 which stores information about executed transactions based on entries from job result queue 242 in common control plane 212. In various embodiments, metadata manager job store 258 may be implemented by a NoSQL data management system, such as a key-value data store, a RDBMS or any other data storage system. In some embodiments, metadata manager job store 258 is partitioned and sub-partitioned, for example, based on logical data containers, to facilitate parallel processing by multiple instances of services such as metadata manager 260.

In the illustrative embodiment, metadata plane 216 also includes one or more metadata managers 260 for generating a cold index of data objects (e.g., stored in cold index store 262) based on records in metadata manager job store 258. As used herein, a "cold" index refers to an index that is updated infrequently. In various embodiments, a cold index is maintained to reduce cost overhead. In some embodiments, multiple metadata managers 260 may periodically read and process records from different partitions in metadata manager job store 258 in parallel and store the result in a cold index store 262.

In some embodiments cold index store 262 may be implemented by a reliable and durable data storage service. In some embodiments, cold index store 262 is configured to handle metadata requests initiated by customers. For example, a customer may issue a request to list all data objects contained in a given logical data container. In response to such a request, cold index store 262 may provide a list of identifiers of all data objects contained in the logical data container based on information maintained by cold index 262. In some embodiments, an operation may take a relative long period of time and the customer may be provided a job identifier to retrieve the result when the job is done. In other embodiments, cold index store 262 is configured to handle inquiries from other services, for example, from front end 208 for inventory, accounting and billing purposes.

In some embodiments, metadata plane 216 may also include a container metadata store 264 that stores information about logical data containers such as container ownership, policies, usage and the like. Such information may be used, for example, by front end 208 services, to perform authorization, metering, accounting and the like. In various embodiments, container metadata store 264 may be implemented by a NoSQL data management system, such as a key-value data store, a RDBMS or any other data storage system.

As described herein, in various embodiments, the archival data storage system 206 described herein is implemented to be efficient and scalable. For example, in an embodiment, batch processing and request coalescing is used at various stages (e.g., front end request handling, control plane job request handling, data plane data request handling) to improve efficiency. For another example, in an embodiment, processing of metadata such as jobs, requests and the like are partitioned so as to facilitate parallel processing of the partitions by multiple instances of services.

In an embodiment, data elements stored in the archival data storage system (such as data components, volumes, described below) are self-describing so as to avoid the need for a global index data structure. For example, in an embodiment, data objects stored in the system may be addressable by data object identifiers that encode storage location information. For another example, in an embodiment, volumes may store information about which data objects are stored in the volume and storage nodes and devices storing such volumes may collectively report their inventory and hardware information to provide a global view of the data stored in the system (such as evidenced by information stored in storage node registrar store 250). In such an embodiment, the global view is provided for efficiency only and not required to locate data stored in the system.

In various embodiments, the archival data storage system described herein is implemented to improve data reliability and durability. For example, in an embodiment, a data object is redundantly encoded into a plurality of data components and stored across different data storage entities to provide fault tolerance. For another example, in an embodiment, data elements have multiple levels of integrity checks. In an embodiment, parent/child relations always have additional information to ensure full referential integrity. For example, in an embodiment, bulk data transmission and storage paths are protected by having the initiator pre-calculate the digest on the data before transmission and subsequently supply the digest with the data to a receiver. The receiver of the data transmission is responsible for recalculation, comparing and then acknowledging to the sender that includes the recalculated digest. Such data integrity checks may be implemented, for example, by front end services, transient data storage services, data plane storage entities and the like described above.

Figure 3:
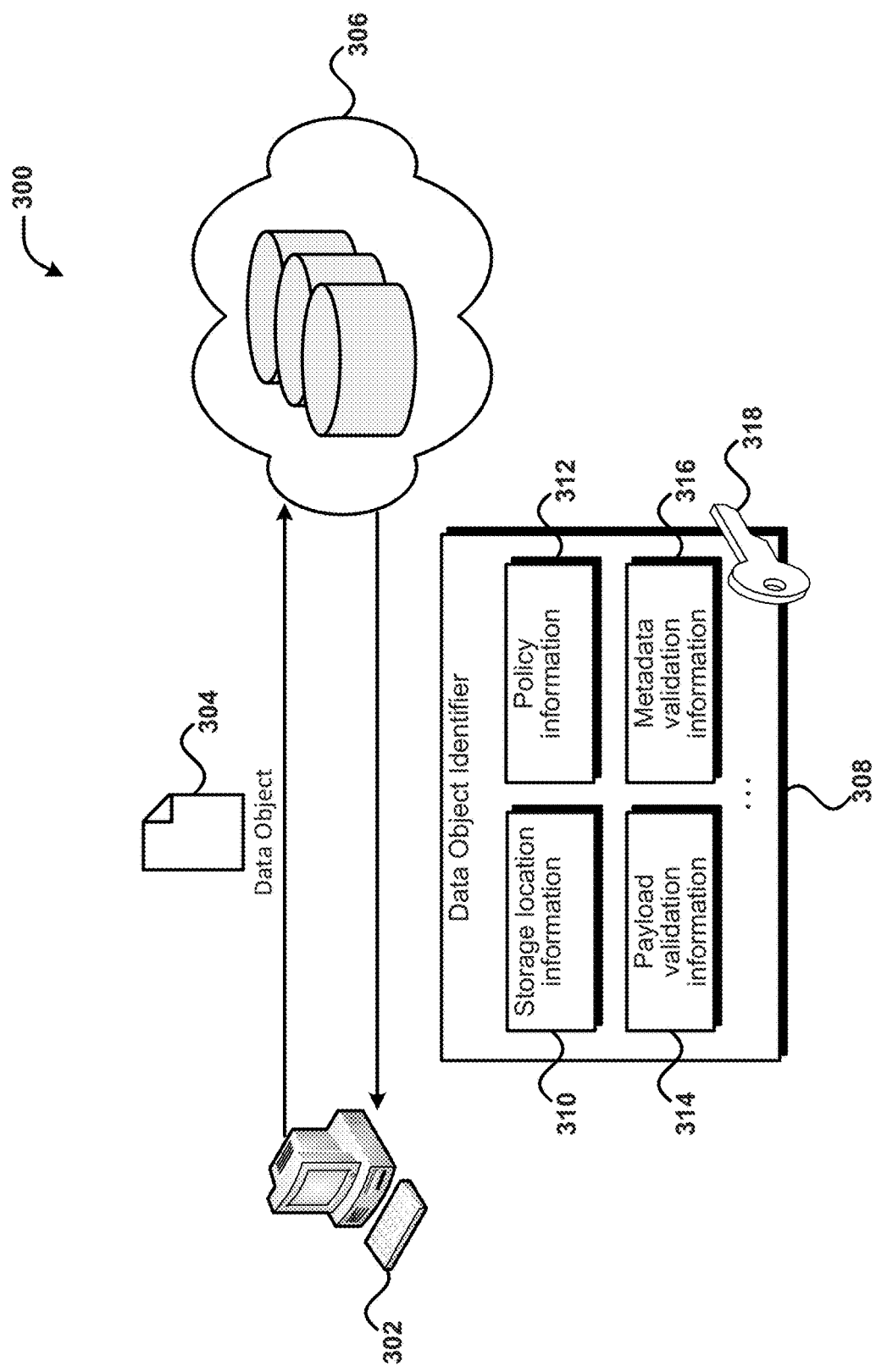
FIG. 3 shows an illustrative example of an environment in which various embodiments may be practiced.

FIG. 3 illustrates an example environment 300 for archival data identification, in accordance with at least one embodiment. As illustrated, in an embodiment, a customer 302 requests that an archival data object 304 be stored in an archival data storage system 306. In some embodiments, customer 302 and archival data storage system 306 may be similar to customer 302 and archival data storage system 306, respectively, as described below in connection with FIG. 3.

In an embodiment, in response to the request, archival data storage system 306 accepts the archival data 304 for storage and provides a data object identifier 308 associated with the archival data 304. Such a data object identifier 308 may be used by subsequent communications with the archival data storage system 306 to retrieve, delete or otherwise identify the archival data 304. In some embodiments, each data object identifier uniquely identifies an archival data object stored in archival data storage system 306. In other embodiments, a data object identifier may be unique under certain circumstances, for example, among data belonging to a particular customer. In some embodiments, as described in more detail below, the data object identifier encodes information (e.g., a location identifier) that can be used to locate a manifest file that points to sub-objects of a corresponding data object.

In an embodiment, data object identifier 308 encodes 318 various information to provide improved reliability, scalability and other characteristics associated with the archival data storage system 306. For example, as illustrated and will be discussed in detail below in connection with FIG. 4, a data object identifier may encode storage location information 310 that may be used to locate stored data, various validation information and the like. In various embodiments, validation information may include policy information 312 that may be used to validate the requested access, payload validation information 314 that may be used to validate the integrity of payload data associated with archival data 304, metadata validation information 316 that may be used to validate the integrity of metadata and the like. In an embodiment, data object identifier 308 may be encoded 318 (such as encrypted) to prevent unauthorized disclosure or alteration of information included in the data object identifier.

Figure 4:
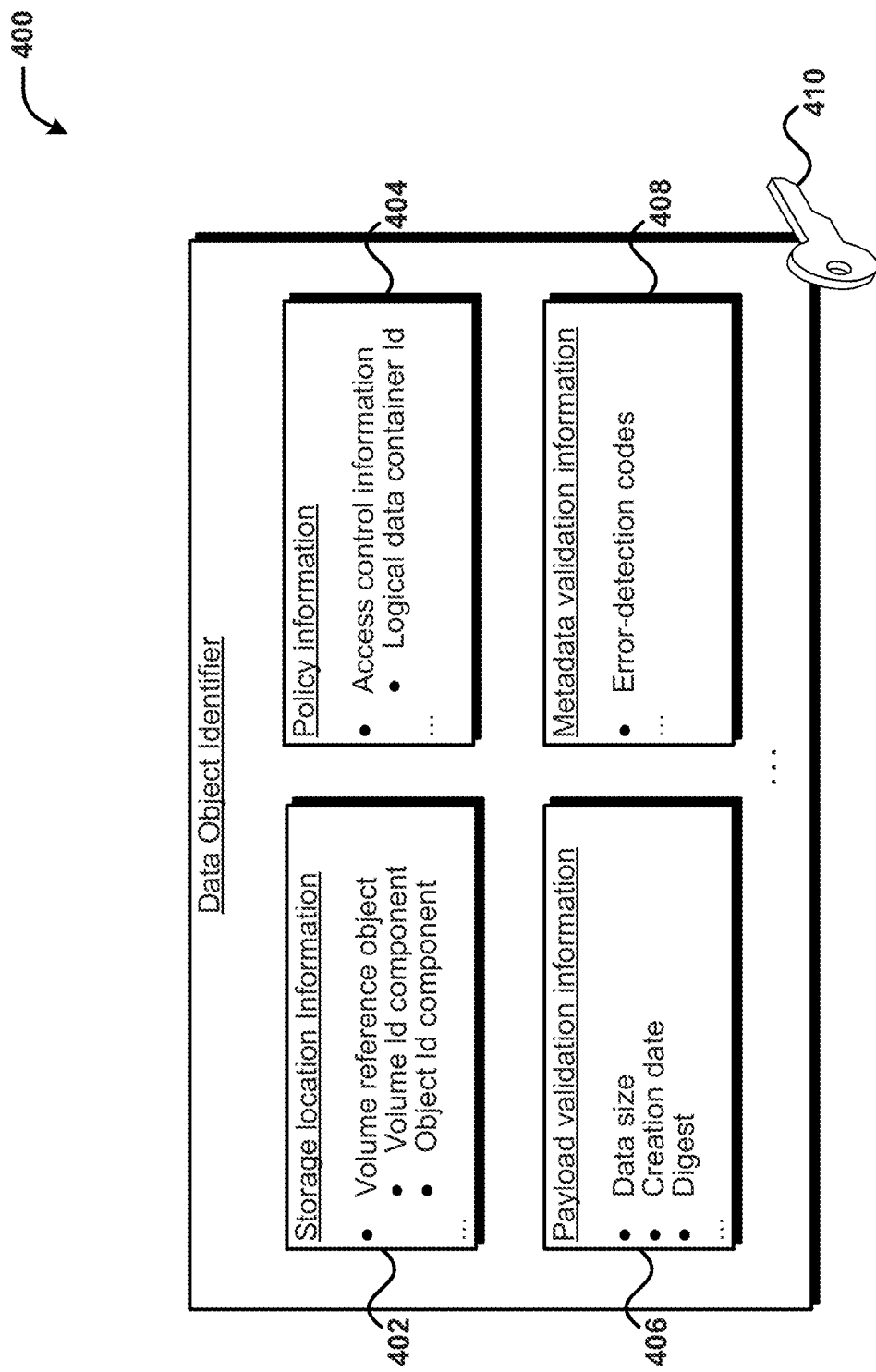
FIG. 4 shows a diagrammatic representation of a data object identifier and information that may be contained therein in accordance with various embodiments.

FIG. 4 illustrates an example representation of a data object identifier 400, in accordance with at least one embodiment. In an embodiment, data object identifier 400 is similar to data object identifier 308 but with more details. In various embodiments, a data object identifier may be a word, number, letter, symbol or any combination thereof, that identifies a data object stored in an archival data storage system such as described in connection with FIG. 2. A data object identifiers may be generated and used by one or more components of an archival data storage system such as described in connection with environment 200 of FIG. 2. In an embodiment, data object identifier 400 encodes a variety of information, described herein, to facilitate effective and trustworthy data retrieval, deletion and other operations. In other embodiments, data object identifier 400 may encode other information instead of and/or in addition to the information described above.

In an embodiment, data object identifier 400 encodes storage location information 402 that may be used to locate a data object stored in an archival data storage system. In embodiments where data object is first stored in a transient data store before being moved to non-transient archival data storage, the storage location information may encode the storage location in the non-transient archival data storage, such as described in connection with FIG. 2 or in a different storage system separate from the storage system described above in connection with FIG. 2. Such an embodiment may reduce or eliminate the need to store a namespace map or similar data structure to map data object identifiers to storage locations of the corresponding data objects.

As illustrated in FIG. 4, storage location information 402 encodes a reference to a hierarchical data structure in which the data object is stored. Such a hierarchical data structure may include volumes, volume components and pages as described in connection with FIG. 2. For example, in an embodiment, storage location information 402 encodes a volume reference object which comprises a volume identifier component and an object identifier component. Referring to FIG. 2, in an embodiment, an archival data storage system stores data in logical volumes where each volume may contain one or more objects. In such an embodiment, a volume identifier may be used to uniquely identify the volume containing a data object and an object identifier may be used to uniquely identify the data object within that volume. For example, a volume reference object may be implemented programmatically as follows, in accordance with at least one embodiment.

VolumeRefObject
{
private short volRefCrc;
private VolumeIdComponent volume;
private ObjectIdComponent id;
}

As illustrated above, in an embodiment, volume and id represent a volume identifier component and an object identifier component, respectively, described below. The id may be an identifier of a data object comprising a manifest file that include one or more references to other data objects that collectively form a data object. In an embodiment, volume reference object may also include an error-detection code such as a cyclic redundancy check (CRC), a hash and the like, to ensure the integrity of the volume reference object. For example, in the example above, volRefCrc may represent a CRC of volume and id that is used to verify the integrity of the volume reference object.

In an embodiment, a volume identifier component may comprise a volume identifier and additional information. For example, a volume identifier component may be implemented programmatically as follows, in accordance with at least one embodiment.

VolumeIdComponent
{
private byte worldId;
private long volumeId;
. . .
}

As illustrated above, in an embodiment, volumeId is a variable that uniquely identifies a volume and worldId is a variable that may be used to disambiguate and/or validate volumeId or other identifiers described herein.

In an embodiment, an object identifier component may comprise an object identifier, described above, and additional information. For example, an object identifier component may be implemented programmatically as follows:

ObjectIdComponent
{
private byte objIdRev;
private int objIdSeq;
private int objIdRnd;
}

As noted above, an object identifier component may comprise variable objIdSeq which may be a monotonically increasing sequence number issued, for example, by storage node registrar 248 as described in connection with FIG. 2, for data placement purposes. The object identifier component may also include additional information to resolve data placement issues. For example, variable objIdRev may provide a revision number which is updated when the object identifier is revised, for example, to avoid collision with that used by another data object. Variable objIdRnd may represent a randomly generated number used to break a tie between two data objects with the same objIdSeq.

Data object identifier 400 may encode policy information 404 for use in enforcing one or more policies associated with data stored in an archival data storage system. In various embodiments, such policies may include policies that address security, privacy, access, regulatory, cost and other concerns. Policies may be applied to customers to control access to data stored in an archival data storage system. For example, a customer may be allowed to read, write and delete a certain set of data (e.g., data stored in the customer's logical data containers) while others may be allowed only to read the data and while others may have no access to the data at all.

In an embodiment, policy information 404 encodes access control information that may be used to validate a requested access to data associated with the data object identifier. For example, in an embodiment, access control information includes a logical data container identifier, such as described in connection with FIG. 2. Such logical data container identifier may identify a logical data container in which the data object identified by the data object identifier is contained. In an embodiment, each customer is associated with one or more logical data containers for which the customer is allowed to perform read, write and/or delete operations. When a request for a data operation arrives with a data object identifier, the logical data container identifier encoded in the data object identifier may be compared with one or more logical data containers associated with the requested data operation for the requesting customer. If the logical data container identified by the logical data container identifier is not found in the list, then the customer may be denied the requested data operation. Other examples of policy information 404 may include identifiers of entities who should be permitted or denied access to the data object, the type of data operations allowed for the data, expiration and/or duration of such policies and the like.

In an embodiment, data object identifier 400 encodes payload validation information 406 to ensure the integrity of data stored in the archival data storage system. In various embodiments, payload validation information may include a data size, a timestamp (e.g., data creation timestamp), a digest and the like. A digest may be calculated by applying a cryptographic hash function such as those associated with SHA-1, SHA-2, MD5, MD6 and the like, a checksum or error-detection code such as cyclic redundancy check and the like to at least a portion of the payload data of a storage request or to a digest described herein. For example, in an embodiment, a digest includes the top-level tree hash of payload data. Other components of a tree hash may also be provided. For example, in some embodiment, the leaf hashes of a tree hash (i.e., the leaf hashes used to generate the tree hash) are also included. Further, in some embodiment, intermediate nodes in a hash tree of the data object are included and whether such intermediate nodes are included may be based at least in part on the size of the data object on which the tree hash is based. In some embodiments, payload validation information 406 may be derived based at least in part on data (e.g., payload, digest) that is provided by a customer.

In an embodiment, data object identifier 400 encodes metadata validation information 408 to ensure the integrity of information associated with a data object identifier. In various embodiments, metadata validation information may include error-detection checks such as a parity check, CRC, error-correction checks and the like of some or all information encoded in the data object identifier such as storage location information, policy information, payload validation information, described herein, and the like.

Putting it all together, in an embodiment, a data object identifier may be implemented programmatically as follows, in accordance with at least one embodiment.

```
DataObjectIdentifer
{
private short dataObjIdCrc;
private long creationDate;
private VolumeRefObject volRefObj;
private long dataSize;
private Id logicalContainerId;
private Digest digest;
}
```

As illustrated above, in an embodiment, a data object identifier comprises variable volRefObj for a volume reference object as part of storing storage location information 402; variable logicalContainerId for a logical data container identifier as part of policy information 404; variables dataSize, creationDate and digest as part of payload validation information 406 and variable dataObjIdCrc, which is a CRC of all of the above information, as part of metadata validation information 408, described above. In other embodiments, the data object identifier may also encode a global unique identifier (GUID) for the data object, which may be used, for example, by a customer to identify the data object identifier on the customer's side.

In an embodiment, information contained in a data object identifier is encrypted 410 before being provided, for example, to a customer, thereby making the data object identifier opaque (not revealing any information) until decrypted or otherwise decoded. For example, such encryption may be necessary to prevent misappropriation of a data object identifier including malicious alteration of the data object identifier and disclosure of internal data structures and information derived from such internal data structures. In addition, encrypting or otherwise obfuscating content of a data object identifier may serve to prevent third parties from relying on implementation details of the archival data storage system and to allow for future changes implementation in a transparent fashion.

In some embodiments, the data object identifier or a portion of it may be encoded using a cryptographic key where the key may be generated using a symmetric-key algorithm such as Data Encryption Standard (DES), Advanced Encryption Standard (AES) or the like or a public-key algorithm such as RSA and the like. In an embodiment, the cryptographic keys used to encrypt the data object identifier may be rotated according to a rotation schedule or algorithm to provide more security. In some other embodiments, the data object identifier may not be encrypted or otherwise obscured.

When the encoded data object identifier is provided to a customer, additional information may be included. In an embodiment, envelope information is provided together with the encrypted data object identifier to facilitate decryption, metadata integrity check and the like. For example, the following information may be prepended to an encrypted data object identifier before being provided to a customer.

```
private short publicCrc;
private int cryptoKeyId;
private byte version;
```

As illustrated above, envelope information may include a CRC of at least a part of the encrypted data object identifier to enable integrity check, publicCrc. Additionally, envelope information may include an identifier of the cryptographic key that is used to encrypt the data object identifier, described above. This identifier may be used by the system to decrypt the data object identifier. Finally, envelope information may include additional information such as a version number version that may be used to handle additional validation check. In addition, information described herein may be further encoded (e.g., using Base64 encoding, Base32 encoding and the like) to facilitate transmission of data over various media.

Figure 5:
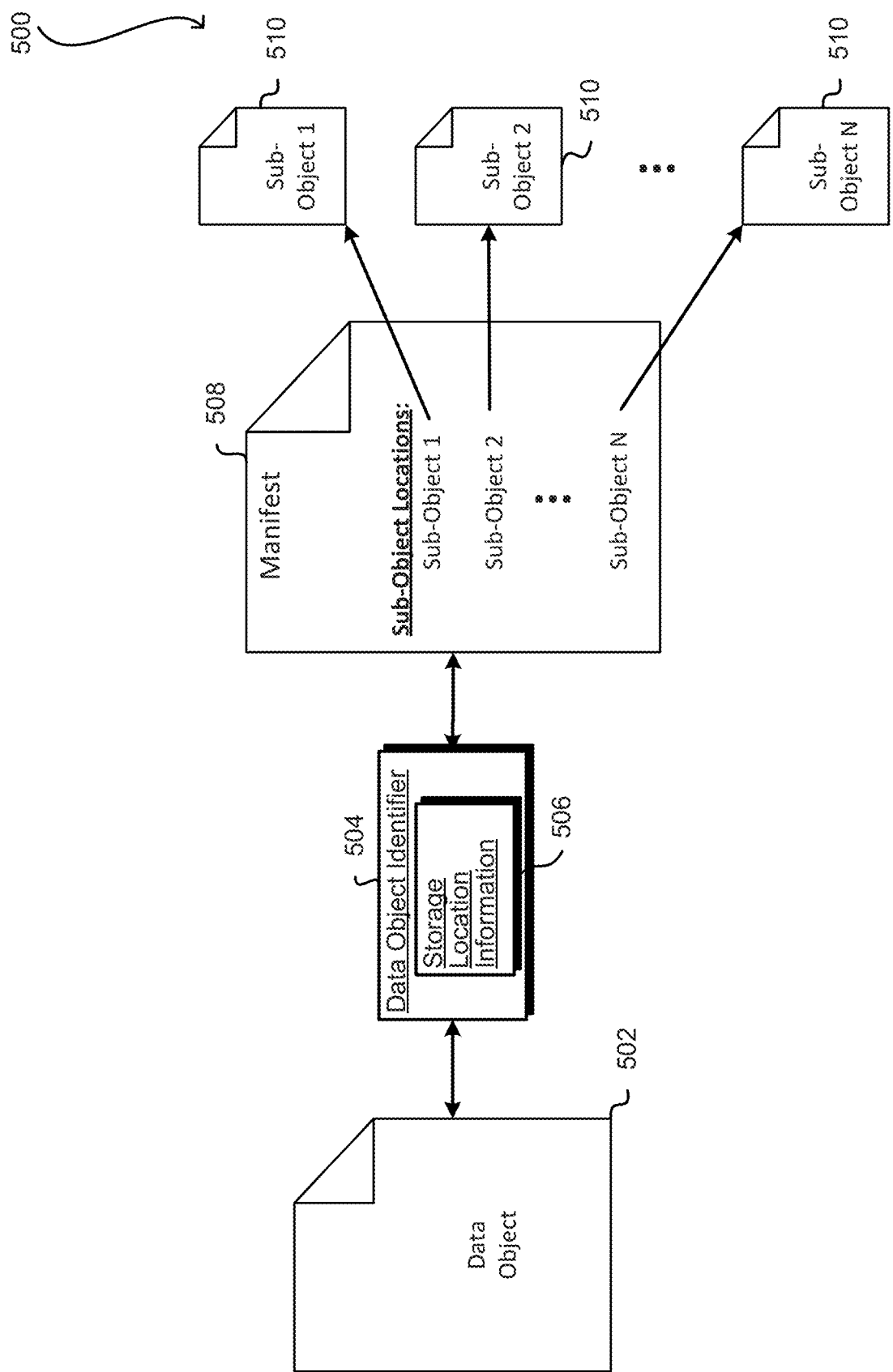
FIG. 5 shows an illustrative example of a diagram representing relationships between various data that may be used in accordance with various embodiments.

FIG. 5 shows an illustrative diagram 500 representing relationships of different types of information that may be used in accordance with various embodiments. As illustrated in FIG. 5, a data object 502 stored by a data storage system corresponds to a data object identifier 504 such as described above. As discussed, the data object identifier may include storage location information 506 and other information, such as described in detail in connection with FIGS. 3 and 4. For at least some data objects stored by the data storage system, the data object identifier 504 may correspond to a manifest 508. The manifest 508 may be a file or other organization of data that includes information about how to construct the data object from data stored by the data storage system. The manifest 508 may store the information about how to construct the data object in a manner consistent with the data storage system's programming, thereby enabling the data storage system to use the information to reconstruct the data object. Further, from the perspective of the data storage system, the manifest may be treated as a data object, i.e., stored and otherwise handled by the data storage system as would other data objects that are not manifests.

The storage location information 506 of the data object identifier 504 may include a location of the manifest 508 in the data storage system. The storage location information 506 may be, for example, storage location information as discussed above. In an embodiment, the manifest 508 includes information about the data object 502. For instance, if the data object 502 has been deconstructed into components, referred to in FIG. 5 as sub-objects 510, the manifest may include information identifying locations of the sub-objects 510. The information identifying locations of the sub-objects 510 may be storage location information such as described above. The locations may be encoded in any suitable manner, such as described above in connection with the storage location information. As one example, the location information may be stored in the manifest 508 in plaintext form. In some embodiments, the location information is stored in the manifest in non-plaintext form. For instance, the locations may also be encoded as data object identifiers for the sub-objects 510, which, as discussed above, may be decoded to find locations of the sub-objects 510. Thus, as illustrated in FIG. 5, a data storage system may retrieve a data object 502 by decoding the data object identifier 504 to identify storage location information 506, which enables the data storage system to locate the manifest 508. Once the manifest 508 has been located, the sub-object locations encoded by the manifest 508 may be used to identify in the data storage system the sub-objects 510.

As can be ascertained by FIG. 5, in some circumstances, the manifest 508 for the data object 502 may be lost or otherwise become at least temporarily inaccessible. For example, a data corruption event such as a device malfunction or deletion by a malicious user can result in the manifest becoming inaccessible, whether stored in the data storage service that stores the corresponding components of the data object or another data storage system. Nevertheless, despite inaccessibility of the manifest, the data storage system may store the sub-objects 510. As discussed above, various embodiments of the disclosure allow for location of the sub-objects 510 without the manifest 508 to enable reconstruction of the manifest 508 and therefore subsequent retrieval of the data object 502.

Figure 6:
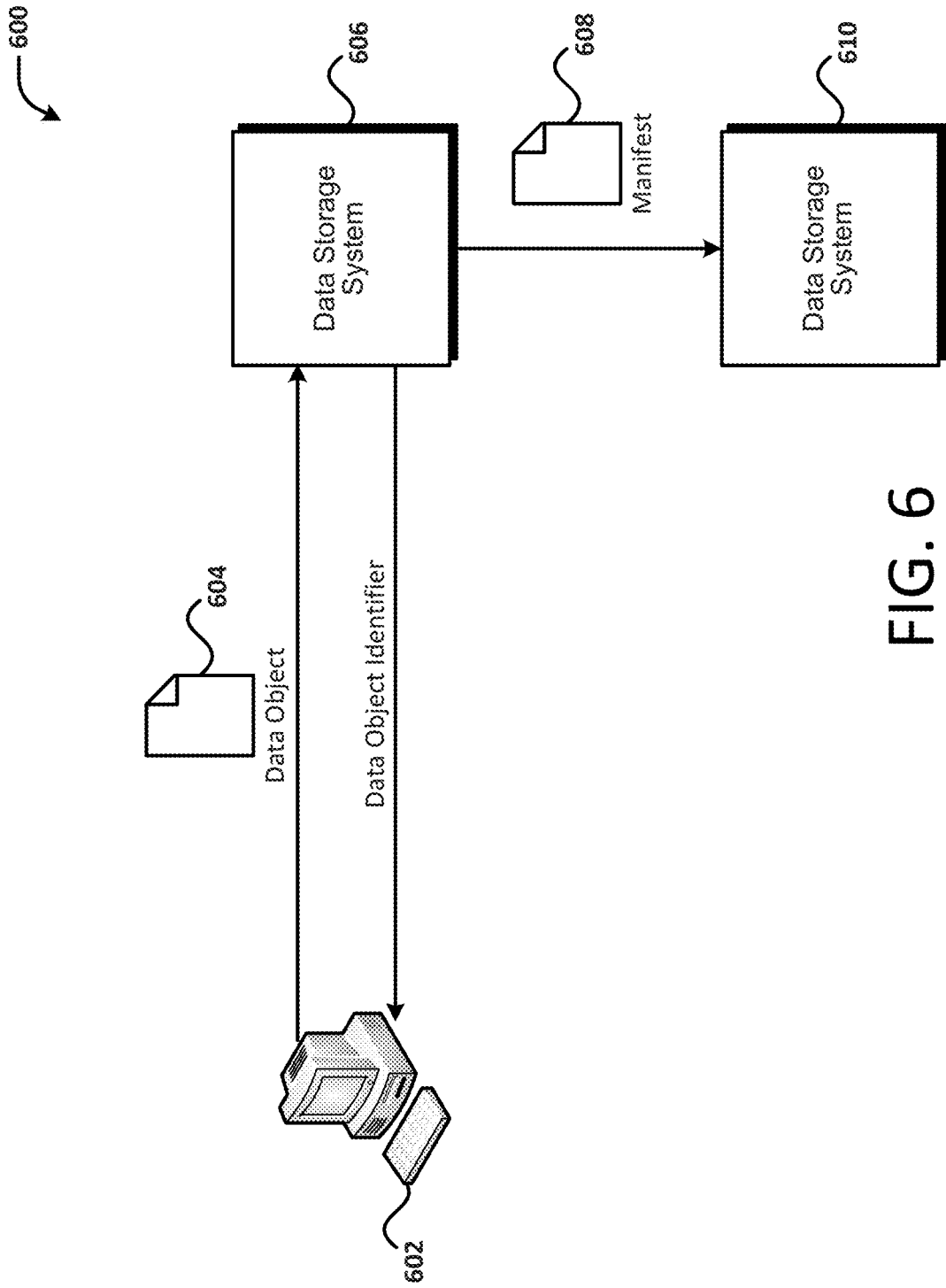
FIG. 6 shows an illustrative example of an environment in which various embodiments may be practiced.

FIG. 6 is an illustrative example of an environment 600 in which various embodiments may be practiced. As illustrated in FIG. 6, an environment includes a client computer system 602. Client computer system 602 may be a device of a customer of an entity that operates the data storage system 606. It should be noted that the client 602 is not necessarily hosted by the customer, but may be hosted by another entity. For example, in some embodiments, the data storage system 606 and client 602 are hosted by a computing resource provider. The customer may also, in some embodiments, operate the client 602 remotely from its own facility. As illustrated in FIG. 6, the client 602 transmits a data object 604 to the data storage system 606. Once the data object 604 has been transferred to the data storage system, the data storage system 606 may generate a data object identifier and provide the data object identifier to the client 602. In some embodiments, however, the data object identifier may be provided before the data object 604 is completely transferred to the data storage system 606. For example, the data storage 606 system may pre-allocate space for a manifest in the data storage system 606 or data storage system 610 and provide a data object identifier before the data object is completely transferred to the data storage system 606. In such embodiments, the contents of the data object identifier may vary from the examples provided above and may not, for example, include information that requires the complete data object for generation (e.g., a tree hash of the data object). Techniques for retrieval and other operations may be adjusted accordingly.

As noted, due to various configurations of the data storage system 606, and various optimizations such as cost optimizations, the data storage system 606 may pre-allocate the storage space for the manifest 608 ahead of time or may, upon generation, provide the manifest 608 to a different data storage system 610. In the specific example illustrated in FIG. 6, the data storage 606 provides the manifest 608 to a different data storage system 610. The location information of a data object identifier for the data object identifier may include information that is indicative of the manifest being stored in the other data storage system 610 and that allows for location of the manifest 608 in the other data storage system 610. Generally, location information used by the data storage system 606 may be configured differently from location information used by the other data storage system 610. In this manner, the configuration of the location information may indicate in which data storage system the manifest is stored.

The different data storage systems 606 and 610 may be used for different purposes and may operate in different ways. For example, in one embodiment, the data storage system 606 is a keymapless archival data storage system that archives data for users of the data storage system 606. The data storage system 610 may be a different type of data storage system that utilizes a different application programming interface (API) and that uses a keymap to identify the locations of data objects stored in the data storage system 610. A different data storage system 606 and 610 may be optimized for different tasks. For example, the data storage system 606 may be configured for long term storage with optimized cost, and not necessarily for speed of access. The data storage 610, on the other hand, may be configured with the ability to provide access to data objects stored therein faster than the data storage system 606. Data object identifiers for each of the data storage systems 606 may also be configured differently. For example, in some embodiments, data object identifiers of the data storage system 606 encode, as described above, information about corresponding data objects. Data object identifiers of the other data storage system 610 may not encode such information, or may encode information about corresponding data objects (e.g., manifests stored by the data storage system 610) that is different from or configured differently from the information encoded by data object identifiers of the data storage system 606. In some embodiments, the data object identifiers for the other data storage system 610 are keys, or otherwise correspond to keys, for a keymap used by the data storage system 610.

Figure 7:
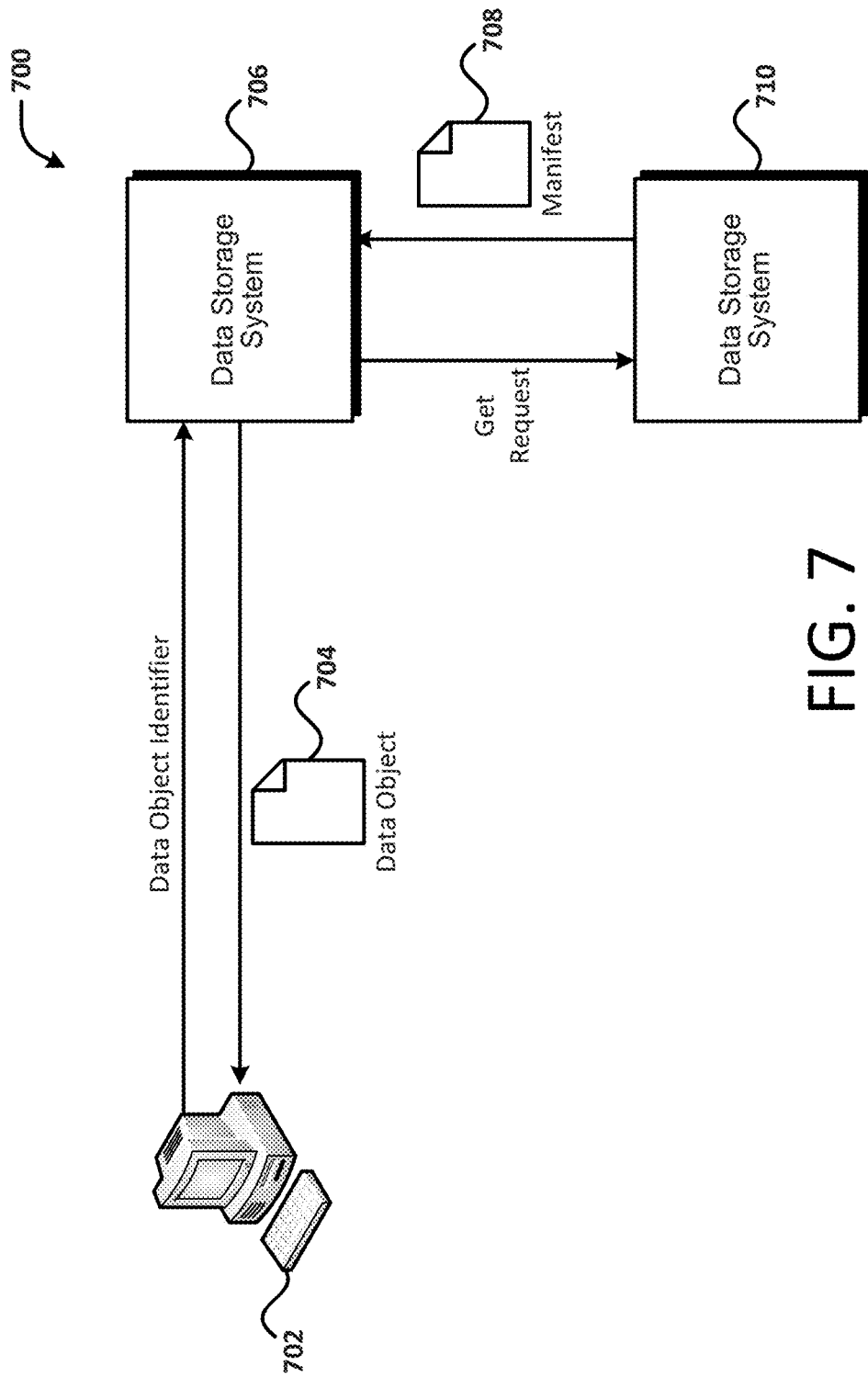
FIG. 7 shows an illustrative example of an environment in which various embodiments may be practiced.

FIG. 7 shows another illustrative example of an environment 700 in which various embodiments of the present disclosure may be practiced. In particular, FIG. 7 shows an environment 700 which may be the environment 600 described above in connection with FIG. 6. In this particular example, however, information flow between the various components of the environment 700 are illustrated in connection with clients 702 communicating with a data storage system 706 to retrieve a data object 704. The client 702, data storage system 706 and data object 704 may be as described above in connection with FIG. 6. Accordingly, the data object 704 may correspond to a manifest 708 which may be persistently stored by another data storage system 710, which may be the same data storage 610 described above in connection with FIG. 6.

Returning to FIG. 7, in an embodiment, the client 702 transmits a data object identifier to the data storage system 706. The client 702 may, for example, transmit an API call to the data storage 706 where the API call includes the data object identifier. The API call may be, for example, a get request to the data storage system 706 to retrieve the data object corresponding to the data object identifier specified in the request. The data storage system 706 may use the obtained data object identifier to submit a get request to the other data storage system 710 in order to retrieve the manifest 708 for the data object 704. For example, the data storage system 706 may decode the data object identifier to obtain the storage location information such as described above. The storage location information may indicate that the manifest 708 is stored by the data storage system 710. Accordingly, the data storage system 706 may be programmed to transmit a get request for the manifest 708 to the other data storage system 710. The request may specify a data object identifier of the other data storage system 710 corresponding to the manifest 708. The other data storage system 710 may process the get request, retrieve the manifest 708 from its storage device(s) and provide the manifest 708 to the data storage system 706.

Once the data storage system 706 receives the manifest 708 from the other data storage system 710, the data storage system 706 may decode storage location information in the manifest 708 to obtain the various components of the data object 704 to reconstruct the data object. The data storage system 706 may then provide the data object 704 to the client 702. The data storage system 706 may provide the data object 704 to the client 702 in various ways in accordance with various embodiments. For example, the data storage system 706 may reconstruct the data object 704 from the components of the data object 704 and may provide the reconstructed data object to the client 702. As another example, the data storage system 706 may provide the components of the data object 704 to the client 702 for the client to reconstruct the data object 704. As yet another example, the data storage system 706 may reconstruct the data object 704 and deconstruct the data object 704 into components which are different from the components that the data storage system 706 received from storage to reconstruct the data object 704. The components may then be sent to the client 702 for reconstruction. Generally, any suitable way of providing the client 702 access to the data object 704 may be used. Further, the data storage system 706 does not necessarily need to provide the data object 704 to the client 702 directly but may, for example, transmit the data object to the data storage system 710 (in components or as a whole) and provide the client 702 a reference to the data object 704 in the other data storage system 710 for the client 702 to retrieve the data object 704 from the other data storage system 710. Other variations are also considered as being within the scope of the present disclosure.

As discussed above, components of a data object are stored in a data storage system or otherwise available to the data storage system. The data storage system also stores or otherwise has available clues that enable location of the data objects in the data storage system should a manifest be lost. In some embodiments, as noted above, these clues include information about when the data object was stored by the data storage system, such as when the data object was provided to the data storage system by a customer or other user of the data storage system. Another clue which may be available to the data storage system may be the size of components of the data object. Other information from which components of a data object may be obtained may be implicit to the data storage system. For example, in some embodiments, the data storage system requires that the components be of equal size except for a single component. The component of non-uniform size may be due to the data object having a size that is not an integer multiple of a component size, an example of which is described above. Other example clues are described above.

Figure 8:
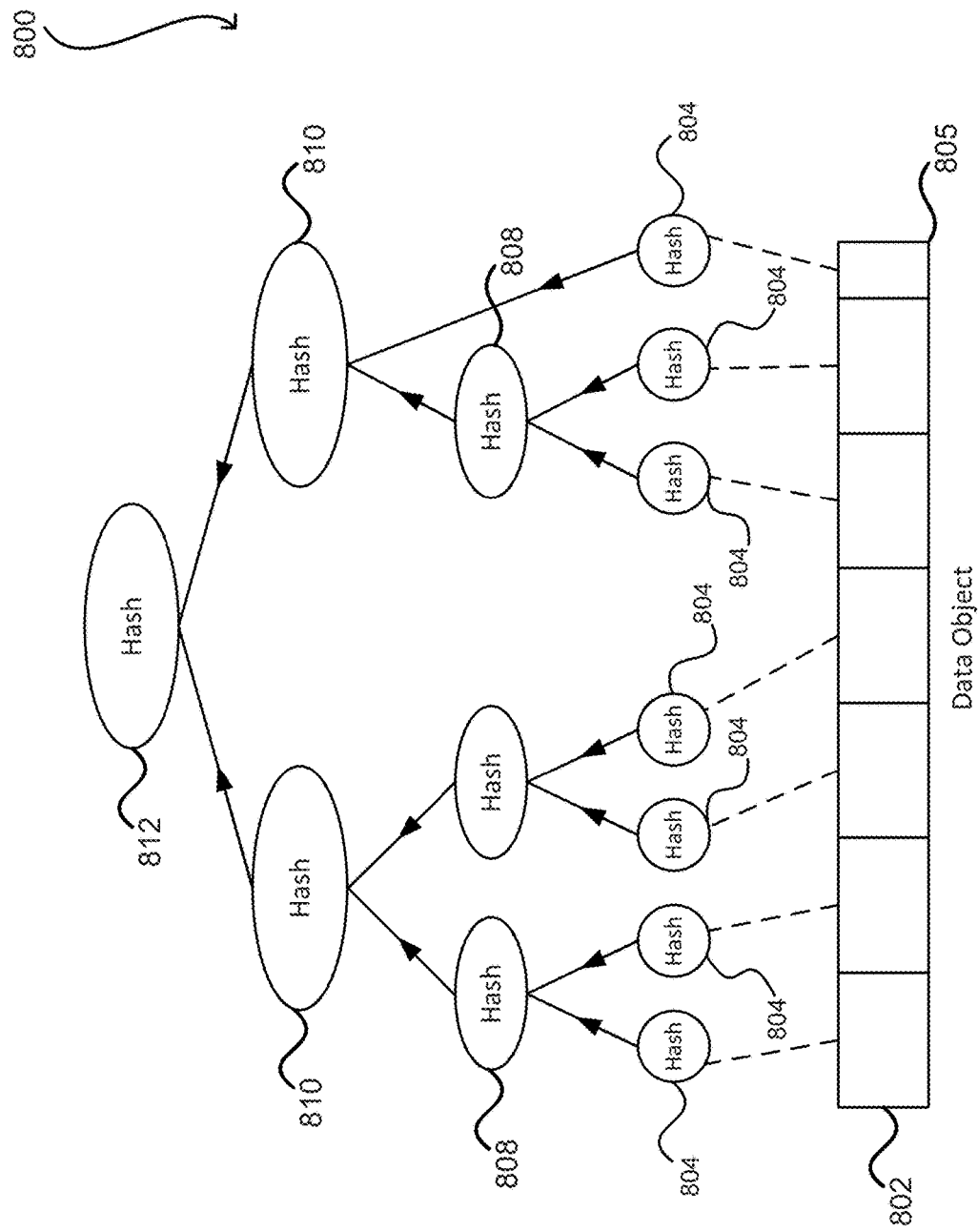
FIG. 8 shows a diagrammatic representation of a hash in accordance with at least one embodiment.

FIG. 8 shows an illustrative example 800 of how a tree hash may be computed in accordance with various embodiments. As illustrated in FIG. 8, a data object 802 is divided into components, each component of which is hashed to generate a leaf hash 804. Each leaf hash (and other hashes described above in connection with FIG. 8) may be generated using a suitable hash function, such as described above. While FIG. 8 illustrates the components as consecutive subsequences of a sequence of bytes comprising the data object, as noted above, other decompositions of the data object, including redundant decompositions for the purpose of use in erasure coding schemes may be used. As noted above, the components of the data object 802 may be all of equal size except perhaps a last component 805 due to the data object 802 not having a size that is an integer multiple of a component size. The leaf hashes 804 may be paired, according to the ordering of corresponding components of the data object 802, and used to generate another hash 808, which is illustrated at an intermediate of the tree structure illustrated in FIG. 8. It should be noted that, in instances where there are an odd number of leaf hashes 804, not all leaf hashes will be used to generate another hash at the intermediate level comprising the hashes 808. In such instances, the last leaf hash 804 can be thought of as simply being carried up to the intermediate level without an additional hash being calculated. As illustrated in FIG. 8, for each level of the tree where there are an odd number of hashes, the hash may be carried up until reaching a level with an even number of hashes. As illustrated, the hashes 808 may be paired to generate another hash 810 at a higher intermediate level. As illustrated, one pairing includes the pairing of a hash 808 and a hash 804 that was carried up to the level of the hashes 808. The hashes 810 may be paired to generate a root hash 812 (also referred to as a "tree hash").

Figure 9:
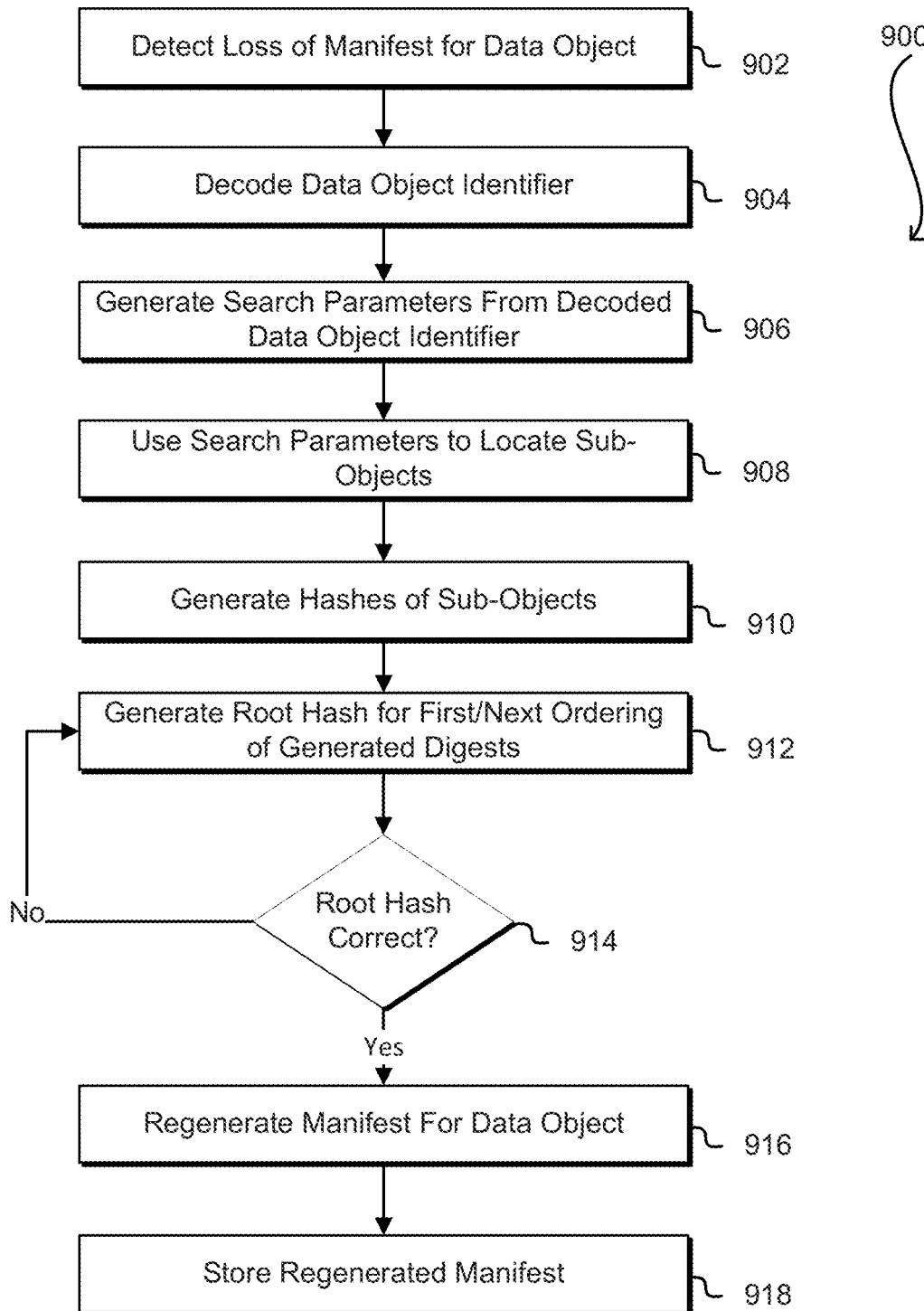
FIG. 9 shows an illustrative example of a process for recovering data in accordance with at least one embodiment.

FIG. 9 shows an illustrative example of a process 900 for restoring a manifest for a data object in accordance with various embodiments. The process 900 may be performed by any suitable system such as a data storage system described above. The process 900 may be performed by a component of the data storage system, which may be an administrative terminal of the data storage system in addition to components described above in connection with FIG. 2. Some or all of the process 900 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an embodiment, the process 900 includes detecting 902 loss or inaccessibility of a manifest for a data object. Detecting 902 loss of a manifest for data object may be performed in any suitable way and in a variety of contexts. For example, various events resulting in data loss may occur and detection of the loss of the manifest may be performed by identifying which data has been affected by the effects, where the affected data includes the manifest. As another example, the loss of the manifest for the data object may be detected upon receipt of a request to retrieve the data object. For example, such a request may be received and used to locate the manifest. If the manifest is unable to be located or a manifest is provided that is corrupted in some way, the loss of the manifest may be detected 902. Generally, the loss of the manifest may be detected in any suitable manner and variations are considered as being within the scope of the present disclosure.

As discussed above, the data object corresponds to a data object identifier. The data object identifier may be stored in various locations and may be obtained in various ways. For example, in the text of a computing resource provider, the data object may be provided from a customer of the computing resource provider or, more generally, from a user of the computing resource provider where a user is not necessarily a human operator of a device, but may be an automated process that communicates with the data storage service. Also, as noted above, various metadata about data objects may be stored in the data storage system and such metadata may include data object identifiers.

The process 900, accordingly, includes 904 decoding a data object identifier for the data object such as described above. The decoded data object identifier may be used to generate 906 search parameters from the decoded data object identifier. Search parameters may, for example, include a component size for the data object, a date and/or time the data object was uploaded to the data storage system, a number of components, and/or other information that may be stored in association with the data object. Search parameters may also include parameters that are based at least in part on implicit information. For example, search parameters may be configured so that a search executed in accordance with the parameters locates data objects of the same size that were uploaded to the data storage system within a certain time period and additional data objects that are smaller than the located data objects and, therefore, are potentially part of the data object. For example, search parameters may be configured to locate data objects of the same size and any data objects of a different but smaller size that were uploaded within some threshold time of any of the located data objects, thereby indicating that the data object(s) of the different but smaller size are part of the data object. Generally, as noted, any clues that are usable to distinguish data objects that are components of a data object for which a manifest was lost, may be used.

The search parameters that have been generated may then be used 908 to locate sub-objects of the data object. Using the search parameters to locate the sub-objects of the data object may be performed in any suitable manner. For example, the search parameters may be sued to query data storage devices and/or sub-systems to identify data objects falling within the parameters. As another example, a sub-system that maintains metadata may be queried to identify (e.g., by corresponding data object identifiers) data objects falling within the parameters. Generally, the manner in which the search parameters are used to locate the sub-objects of the data object may be used and the techniques for searching may vary with the systems of the various embodiments.

Once the sub-objects have been located 908, the hashes of the sub-objects may be generated 910. A hash function used to generate the hashes may be the same hash function used to generate a tree hash that is part of the data object identifier for the data object. As illustrated in FIG. 9, various orderings of the sub-objects may be used to check whether the orderings are correct to determine a construction of the data objects using the sub-objects. In an embodiment, a construction of the data object comprises an ordering of the sub-objects. Generally, a construction is any information that indicates how the sub-objects can be used to reconstruct the data object. In particular, process 900 includes generating 912 a root hash for a first or next ordering of the generated digests, such as by using the technique illustrated in FIG. 8. For each ordering, the process 900 may include checking 914 whether the root hash is correct. If determined 914 that the root hash is incorrect, the process 900 may include generating a root hash for the next ordering of generated hashes. This process may continue until it is determined 914 that the root hash is correct and the process may include regenerating 916 the manifest for the data object. Once the manifest is regenerated 916, the regenerated manifest may be stored 918 in the data storage system or in another data storage system such as described above.

As noted above, numerous variations are considered as being within the scope of the present disclosure. For example, in various embodiments, a root hash for a data object is stored and available for regeneration of a manifest. Other hashes used in generation of a tree hash may also be stored, for example, for particularly large data objects. Referring to the tree structure illustrated in FIG. 8, for example, hashes of intermediate levels in the tree may be stored by the data storage system. For instance, using FIG. 8's illustrative example, the hashes 808 at the corresponding intermediate level illustrated in the figure may be stored by a data storage system (e.g., in the metadata plane 216 of FIG. 2). The checking whether orderings of subsets of the leaf hashes result in the hashes 808 may be performed to determine orderings of subsets, each subset corresponding to a tree rooted at the hash 808. The process of checking orderings of the hashes 808 may then be used to determine the proper ordering of the hashes 808 and, therefore, the corresponding ordering of the components of the data object. As will be appreciated, such variations may be extended to store hashes of more than two levels of a hash tree structure, and the process may be modified accordingly. In this manner, a technical advantage is achieved since the total number of computations necessary to determine the proper ordering of components is less than it would be if only leaf hashes and the root hash were available.

Numerous variations of the above illustrative embodiments are considered as being within the scope of the present disclosure. For example, some embodiments of the present disclosure relate to storage of a manifest and corresponding data object in different data storage systems. As noted, determinations whether to store the manifest and data object in the same or in different data storage systems may be made based at least in part on cost. In some embodiments, a manifest (or other data object) may be migrated among multiple data storage systems for the purpose of minimizing costs. For instance, a may be initially stored in a data storage system separate from the data storage system used to store the corresponding data object (i.e., the components of the corresponding data object) but, after a time period, the manifest may be moved to the same data storage system. Various techniques may be used to allow data object retrieval without a keymap. For example, when a manifest is moved from one data storage system to another, the manifest may be replaced with another data object that references the manifest's new location. In other words, when a manifest is moved, a manifest for the manifest may be generated and stored to allow location of the manifest from a data object identifier, which would identify the manifest for the manifest after the move. In other embodiments, a keymap may be used for some data objects to track manifest migrations. In such embodiments, a keymap would be used for some, but not all, data object retrievals. Other variations, such as updating data object identifiers, may also be used in accordance with the various embodiments.

In addition to the foregoing examples of variations within the scope of the present disclosure, other variations may be practiced. As one example, for the purpose of illustration, manifests for data objects are used, where the manifests are described as files that are treated as data objects. Manifests may vary in accordance with the various embodiments and, generally, any technique for storing information usable to locate components of a data object may be used. As just one example, a manifest may be stored as rows of a relational database of a data storage system. Further, the form of a manifest may vary within the various embodiments. For example, the manifest may take one form in one data storage system and may be converted to another form if/when moved to another data storage system. As noted, other variations are also considered as being within the scope of the present disclosure.

Figure 10:
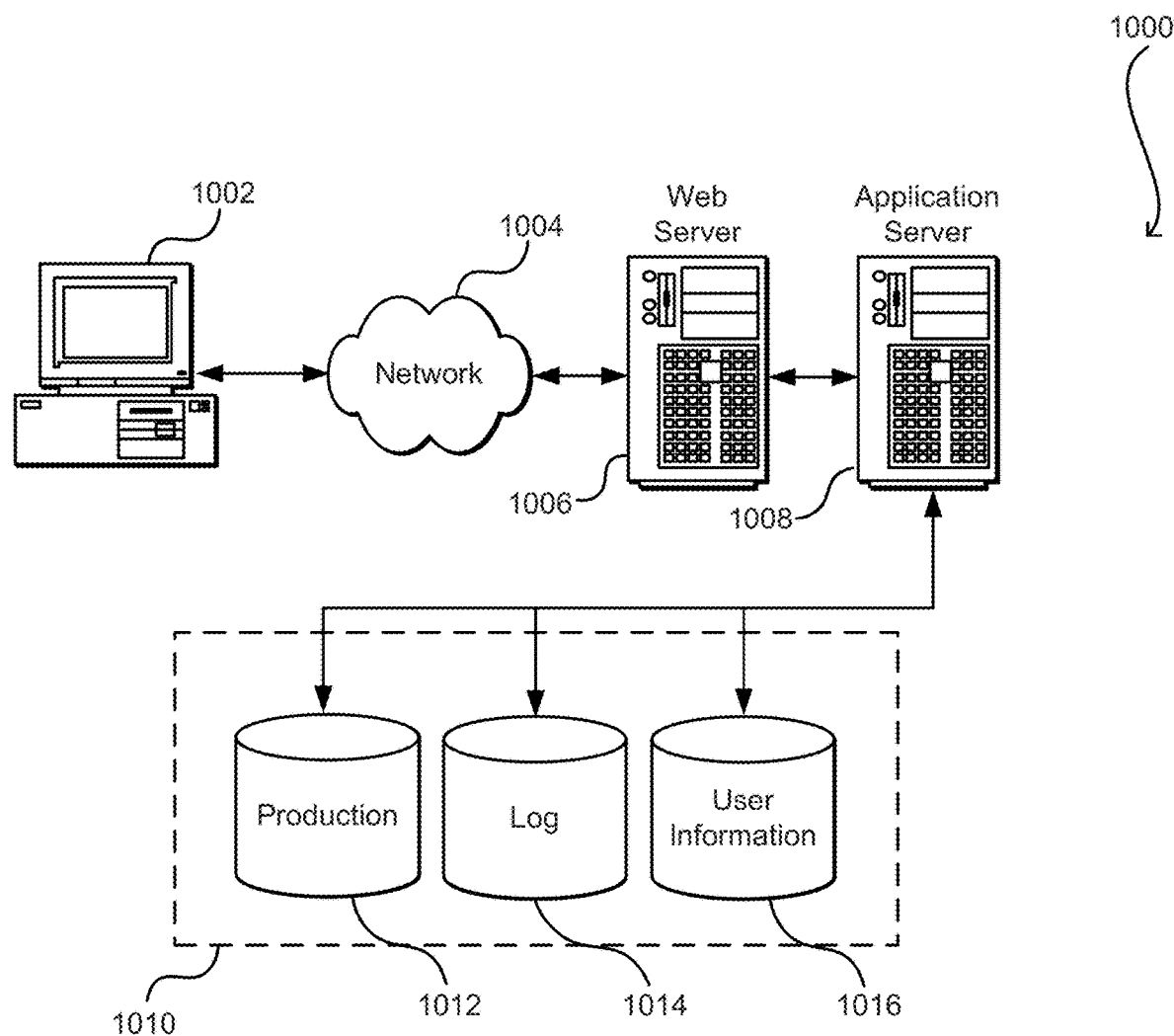
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   storing, by one or more computing systems, a plurality of components corresponding to a data object in different locations of a data storage system, the plurality of components being generated by applying a redundancy encoding to the data object;
   generating, by the one or more computing systems and based at least in part on a configuration of the data storage system, a manifest for the data object that includes at least:
      locations, in the data storage system, of the plurality of components; and
      information that identifies at least one construction of the data object from a subset of the plurality of components, the at least one construction based at least in part on the configuration;
   storing the manifest in a different data storage system;
   detecting, by the one or more computing systems, inaccessibility of the manifest from the different data storage system; and
   as a result of detecting the inaccessibility of the manifest:
      determining, by the one or more computing systems, without access to the manifest and based at least in part on a search parameter obtained from a data object identifier corresponding to the data object, the locations of the plurality of components, wherein the data object identifier includes information indicative of a location of the generated manifest;
      determining, by the one or more computing systems, without access to the manifest, and based at least in part on the determined locations and based at least in part on the configuration, a construction of the data object from the plurality of components; and
      regenerating, by the one or more computing systems, the manifest based at least in part on the determined construction.

2. The computer-implemented method of claim 1, wherein the data storage system is configured to respond to requests to retrieve data objects stored by the data storage system without using a keymap associating data object identifiers with locations of corresponding data objects stored by the data storage system.

3. The computer-implemented method of claim 1, wherein locating the plurality of components includes distinguishing, based at least in part on one or more characteristics of the data object obtained from outside of the manifest and the configuration of the data storage system, the plurality of components from other data objects stored by the data storage system.

4. The computer-implemented method of claim 1, wherein the method further comprises:
   obtaining, without accessing the manifest, a hash associated with the data object, wherein determining the construction includes determining an ordering of the plurality of components of the data object that results in a tree hash that matches the obtained hash.

5. The computer-implemented method of claim 4, wherein obtaining the hash includes decoding the hash from a data object identifier corresponding to the data object.

6. The computer-implemented method of claim 1, wherein storing the manifest in the different data storage system is a result of determining to store the manifest in the different data storage system based at least in part on a projected cost of storing the manifest in the different data storage system being less than a projected cost of storing the manifest in the data storage system.

7. The computer-implemented method of claim 1, further comprising, as a result of detecting the inaccessibility of the manifest:
   retrieving, by the one or more computing systems, the search parameter from the data object identifier corresponding to the data object, the data object identifier being formatted to comprise one or more search parameters, wherein the locating of the plurality of components of the data object is based at least in part on the one or more search parameters, the one or more search parameters comprising one or more of a component size for the data object, time information identifying when the data object was stored in the data storage system, or a number of components for the plurality of components of the data object.

8. The computer-implemented method of claim 7, wherein the one or more search parameters further comprises at least one of a first size of the data object or a second size corresponding to a component.

9. The computer-implemented method of claim 1, wherein determining the constructions of the data object comprises:
   generating a hashed identifier based at least in part on a hash tree and the plurality of components; and
   determining that the hashed identifier matches a previously-determined hashed identifier associated with the data object.

10. A computer-implemented method, comprising:
    generating a manifest for a data object, the manifest including at least:
       locations, in a data storage system, of a plurality of components corresponding to the data object, the plurality of components generated by applying a redundancy encoding to the data object; and construction information for the data object identifying a subset of the plurality of components; and regenerating the manifest by at least:
  determining, based at least in part on a search parameter obtained based at least in part on an identifier of the data object, the locations of the plurality of components, wherein the identifier of the data object includes information indicative of a location of the generated manifest;
  determining, without access to the manifest, a construction of the data object using a subset of the plurality of components; and
  processing at least the determined construction to create the manifest.

11. The computer-implemented method of claim 10, wherein locating the plurality of components includes selecting the components based at least in part on one or more characteristics of the data object obtained without accessing the manifest.

12. The computer-implemented method of claim 11, wherein the one or more characteristics include a time of upload of the data object to the data storage system.

13. The computer-implemented method of claim 10, wherein locating the plurality of components includes selecting a set of components that are each a same size.

14. The computer-implemented method of claim 10, wherein the method further comprises:
  detecting inaccessibility of the manifest from a different data storage system; and
  regenerating the manifest in response to detecting the inaccessibility of the manifest.

15. The computer-implemented method of claim 10, wherein the search parameter is encoded in the identifier of the data object.

16. A system, comprising:
  one or more processors; and
  memory, including instructions that, if executed by the one or more processors, cause the system to:
    identify, based at least in part on characteristics of a data object, a subset of a set of data objects persistently stored among a plurality of data storage devices, the subset comprising components of the data object;
    determine, based at least in part on comparing a hash generated based on a potential ordering of the subset to a hash derived from an identifier of the data object, a construction of the data object using the identified subset; and
    generate, based at least in part on the construction of the data object and the configuration, a manifest for the data object, the manifest comprising a specification of the subset informing construction of the data object from the subset.

17. The system of claim 16, wherein the instructions further cause the system to retrieve data objects without using a keymap that associates the data objects with respective locations in the system.

18. The system of claim 16, wherein the subset includes a plurality of data objects that were uploaded to the system within a predetermined time period and that are a same size.

19. The system of claim 16, wherein the instructions further cause the system to persist the generated manifest in a data storage system that is different from the system.

20. The system of claim 16, wherein:
  the system is hosted by a computing resource provider as a service to customers of the computing resource provider;
  the instructions further cause the system to provide an application programming interface for enabling the customers to utilize the service; and
  the subset of data objects is stored on behalf of a particular customer of the customers.

21. One or more non-transitory computer-readable storage media having stored thereon instructions that, if executed by one or more processors of a computer system, cause the computer system to generate a manifest for a data object by at least:
  locating, in a data storage system, a plurality of components of the data object that are combinable to construct the data object, the locating based at least in part on information indicative of a composition of the data object obtained from an identifier of the data object;
  determining, without access to the manifest, and based at least in part on comparing a hash generated based on a potential ordering of a subset of plurality of components to a hash derived from an identifier of the data object, a construction of the data object using the subset of the plurality of components; and
  generating, based at least in part on the determined construction, the manifest to include the construction and locations of the subset of the plurality of components.

22. The one or more non-transitory computer-readable storage media of claim 21, wherein:
  the instructions further cause the computer system to store the generated manifest such that a data object identifier existing prior to generation of the generated manifest is usable, without a keymap, to locate the generated manifest.

23. The one or more non-transitory computer-readable storage media of claim 22, wherein storing the generated manifest includes causing a data storage system, different from the computer system, to persist the generated manifest.

24. The one or more non-transitory computer-readable storage media of claim 21, wherein the instructions cause the computer system to locate the plurality of components, determine the construction, and generate the manifest as a result of detecting an inaccessibility of a previously generated manifest for the data object.

25. The one or more non-transitory computer-readable storage media of claim 21, wherein determining the construction includes determining the ordering of the plurality of components that is usable to obtain a tree hash of the data object.

26. The one or more non-transitory computer-readable storage media of claim 21, wherein locating the plurality of components includes identifying data objects that were uploaded during a time period determined to be near a time at which the data object was uploaded.

* * * * *